(12) United States Patent
Ouzounis

(10) Patent No.: US 9,031,325 B2
(45) Date of Patent: *May 12, 2015

(54) AUTOMATIC EXTRACTION OF BUILT-UP FOOTPRINTS FROM HIGH RESOLUTION OVERHEAD IMAGERY THROUGH MANIPULATION OF ALPHA-TREE DATA STRUCTURES

(71) Applicant: DigitalGlobe, Inc., Longmont, CO (US)

(72) Inventor: Georgios Ouzounis, Remagen (DE)

(73) Assignee: DigitalGlobe, Inc., Longmont, CO (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/013,904

(22) Filed: Aug. 29, 2013

(65) Prior Publication Data
US 2015/0023550 A1    Jan. 22, 2015

Related U.S. Application Data

(60) Provisional application No. 61/856,574, filed on Jul. 19, 2013.

(51) Int. Cl.
| | | |
|---|---|---|
| *G06K 9/34* | (2006.01) | |
| *G06K 9/46* | (2006.01) | |
| *G06K 9/66* | (2006.01) | |
| *G06K 9/62* | (2006.01) | |
| *G06K 9/00* | (2006.01) | |

(52) U.S. Cl.
CPC .................................. *G06K 9/00637* (2013.01)

(58) Field of Classification Search
USPC .......... 382/113, 173, 190, 194, 197, 224, 225
See application file for complete search history.

(56) References Cited

U.S. PATENT DOCUMENTS

| | | | |
|---|---|---|---|
| 8,483,425 B2* | 7/2013 | Guo et al. ..................... | 382/100 |
| 8,630,510 B2* | 1/2014 | Giuffrida et al. ............. | 382/284 |
| 8,682,079 B1 | 3/2014 | Ouzounis | |

(Continued)

FOREIGN PATENT DOCUMENTS

WO       2013082280 A1     6/2013

OTHER PUBLICATIONS

Georgios K. Ouzounis and Pierre Soille, "Attribute Constrained Connectivity and Alpha-Tree Representation," Global Security and Crisis Management Unit, Institute for the Protection and Security of the Citizen, Joint Research Centre, European Commission, University of Groningen, Groningen, Netherlands, Jan. 24, 2012.

(Continued)

*Primary Examiner* — John Strege
(74) *Attorney, Agent, or Firm* — Marsh Fischmann & Breyfogle LLP; Jonathon A. Szumny

(57) ABSTRACT

A system for automatically extracting or isolating structures or areas of interest (e.g., built-up structures such as buildings, houses, shelters, tents; agricultural areas; etc.) from HR/VHR overhead imagery data by way of making as little as a single pass through a hierarchical data structure of input image components (where pixels are grouped into components based on any appropriate definition or measure of dissimilarity between adjacent pixels of the input image) to identify candidate components (e.g., possible structures of interest) free of necessarily having to re-iterate the same operator configured with different threshold parameters for a plurality of values.

33 Claims, 15 Drawing Sheets

(56) References Cited

U.S. PATENT DOCUMENTS

| | | |
|---|---|---|
| 2011/0075882 A1 | 3/2011 | Guo et al. |
| 2011/0102461 A1 | 5/2011 | Schultz et al. |
| 2012/0007982 A1 | 1/2012 | Giuffrida et al. |
| 2013/0077819 A1 | 3/2013 | Du et al. |

OTHER PUBLICATIONS

D. Ehrlich, T. Kemper, X. Blaes, P. Soille, "Extracting building stock information from optical satellite imagery for mapping earthquake exposure and its vulnerability," Institute for the Protection and Security of the Citizen, Joint Research Centre, European Commission, Nov. 20, 2012.

Georgios K. Ouzounix and Pierre Soille, "The Alpha-Tree Algorith, Theory, Algorithms, and Applications," JRC Technical Reports, Joint Research Centre, European Commision, Dec. 2012.

Martino Pesaresi et al., "A Global Human Settlement Layer from Optical HR/VHR RS data: concept and first results," IEEE Journal of Selected Topics in Applied Earth Observations and Remote Sensing, Aug. 15, 2013, vol. 6, No. 5.

Martino Pesaresi, Georgios K. Ouzounix, and Lionel Gueuguen, "A new compact representation of morphological profiles: report on first massive VHR image processing at the JRC," Algorithms and Technologies for Multispectral, Hyperspectral, and Ultraspectral Imagery XVIII, Proc. of SPIE vol. 8390 839025-5, Apr. 23, 2012.

Georgios K. Ouzounix, Martino Pesaresi, and Pierre Soille, "Differential Area Profiles; Decomposition Properties and Efficient Computation," IEEE Transactions on Pattern Analysis and Machine Intelligence, Dec. 20, 2011.

Martino Pesaresi et al., "A Global Human Settlement Layer from Optical High Resolution Imagery, Concept and First Results," Joint Research Centre, European Commission, Institute for the Protection and Security of the Citizen, Dec. 2012.

G. Ouzounis and P. Soille. Pattern spectra from partition pyramids and hierarchies. Lecture Notes in Computer Science, 6671:108-119, 2011. doi: 10.1007/978-3-642-21569-8_10.

G.K. Ouzounis and P. Soille. "Differential area profiles". In: 20th Int. Conf. on Pattern Recognition, ICPR 20IO. Istanbul, Turkey, Aug. 2010, pp. 4085-4088. DOI: 10.1109/ICPR. 2010. 993 (cit. on p. 1).

Haxhimusa et al., Hierachical Image partitioning with dual graph contraction, 2003, pp. 1-27.

International Search Report, Nov. 18, 2014, for PCT/US2014/046.

P. Soille. Constrained connectivity for hierarchical image partitioning and simplification. IEEE Transactions on Pattern Analysis and Machine Intelligence, 30(7):1132-1145, Jul. 2008. doi: 10.1109/TPAMI.2007.70817.

P. Soille. Preventing Chaining through Transitions While Favouring It within Homogeneous Regions. Lecture Notes in Computer Science, 6671:96-107, 2011. doi: 10.1007/978-3-642-21569-8_9.

P. Soille and L. Najman. On morphological hierarchical representations for image processing and spatial data clustering. Lecture Notes in Computer Science, 7346:43-67, 2012. doi: 10.1007/978-3-642-32313-3_4.

G.K. Ouzounis, V. Syrris, L. Gueguen, and P. Soille. "The switchboard platform for interactive image information mining." In: Proc. of 8th Conference on Image Information Mining. European Commission, Joint Research Centre, Oct. 2012, pp. 26-30. doi: 10. 2788/49465 (cit. on p. 39).

G.K. Ouzounis and M.H.F. Wilkinson. "Mask-based second-generation connectivity and attribute filters". IEEE Transactions on Pattern Analysis and Machine Intelligence 29.6 (2007), pp. 990-1004. doi: 10.1109/TPAMI.2007.1045 (cit. on pp. 6, 19).

G.K. Ouzounis and M.H.F. Wilkinson. "Partition-induced connections and operators for pattern analysis". Pattern Recognition 43.10 (2010), pp. 3193-3207. doi: 10.1016/j.patcog.200910.002 (cit. on pp. 1, 6, 13).

\* cited by examiner

AUTOMATIC EXTRACTION OF BUILT-UP FOOTPRINTS FROM HIGH RESOLUTION OVERHEAD IMAGERY THROUGH MANIPULATION OF ALPHA-TREE DATA STRUCTURES

CROSS-REFERENCE TO RELATED APPLICATIONS

This application claims priority from U.S. Patent App. No. 61/856,574, entitled "SCALABLE EXTRACTION OF OBJECT FOOTPRINTS FROM OVERHEAD IMAGE DATA," and filed on Jul. 19, 2013, the entire contents of which are incorporated herein by reference as if set forth in full.

BACKGROUND

Information on human settlements is crucial for a wide range of applications including emergency response, disaster risk reduction, population estimation/analysis, and urban/regional planning. Urbanization pressure generates environmental impacts, indicates population growth, and relates to risk and disaster vulnerability. For instance, the global population passed the mark of 7.0 billion in 2011 with more than half of the population living in urban areas. Between 2011 and 2050, the urban population is expected to increase by about 2.7 billion, passing from 3.6 billion in 2011 to 6.3 billion in 2050. The population growth in urban areas is projected to be concentrated in the cities and towns of the less developed countries and continents. Asia, in particular, is projected to see its urban population increase by 1.4 billion, Africa by 0.9 billion, and Latin America and the Caribbean by 0.2 billion.

Population growth is therefore becoming largely an urban phenomenon concentrated in the developing world resulting in major challenges to manage the urban development in a sustainable manner. A central issue in this respect is the availability of up-to-date information on the extent and quality of the urban settlement (e.g., the urban "built-up" or "build-up," such as man-made 3-dimensional structures) which is largely unavailable in developing countries. For instance, cities are often growing at a pace that cannot be fully controlled by the local or regional mapping agencies. As demographic pressure increases exponentially at a global level, the ability to monitor, quantify and characterize urbanization processes around the world is becoming paramount. The information about the quality of urban development can provide precious input for understanding the vulnerability of the population living on our planet.

While overhead imagery such as satellite imagery could provide information about the world-wide built-up environment, there are few global data sets available that could be used to map the human settlements. Examples include the night-time lights of the world based on the Defense Meteorological Satellite Program-Operational Linescan System (DMSP-OLS) sensor, Moderate Resolution Imaging Spectroradiometer (MODIS) based land use/land cover classifications, and global population data sets like LandScan™ or the gridded population of the world (GPW). While the aforementioned data sets are useful for global analysis, the data sets have the tendency to under-represent small, scattered rural settlements due to the low spatial resolution of the data sets between, for instance, 500 and 2,000 m. Furthermore, the data sets represent single snap-shots in time that do not allow for regular monitoring and are typically not directly comparable when updated (e.g., the Landscan data set) due to changing input sources. Another example is the Global Human Settlement Layer (GHSL) of the Joint Research Centre of the European Commission that is a visual analytics tool for exploring the urban built-up in selected areas around the globe at high resolution. However, the GHSL does not deliver an actual information layer that can be used for further processing and parameter extraction.

SUMMARY

Although high resolution (HR, 1-10 m spatial resolution) and even very high resolution (VHR, ≤1 m) overhead imagery data with an almost global coverage is or will be available with different sensors (e.g., System for Earth Observation (SPOT), ChinaBrazil Earth Resources Satellite program (CBERS), RapidEye, IKONOS® 2, QuickBird, WorldView-1, WorldView-2, WorldView-3), no consistent global coverage of built-up settlements derived from these datasets exists. Mapping and monitoring of urban areas at HR and VHR scales is mostly limited in terms of temporal and spatial coverage. The lack of a consistent global layer with HR/VHR spatial resolution can be attributed to a number of reasons. In one regard, global coverage is costly due to, for instance, the fact that most HR/VHR satellite missions are operated on a commercial basis. In another regard, no systems have yet been able to demonstrate the capacity to automatically extract global information layers about human settlement (built-up structures such as cities, refugee camps, etc.) from HR/VHR overhead data with relatively low levels of time, effort (e.g., low number of processor clock cycles), and other computational costs.

In this regard, disclosed herein are utilities (e.g., systems, methods, etc.) for automatically (e.g., in a manner that is substantially free of user input or intervention) extracting structures of interest (e.g., built-up such as buildings, houses, shelters, tents, etc.) from HR and VHR overhead imagery data (e.g., multispectral, panchromatic, red-green-blue (RGB), etc.) and presenting the extracted structures of interest in images of the same or similar extent/projection as the input images in a globally and regionally consistent manner. Stated differently, the disclosed utilities are operable to extract any desired structures of interest from HR/VHR input image data and automatically deliver footprints of the structures of interest (e.g., traces of 3-dimensional man-made ground structures approximated by discrete contours) free of any assumptions as to the type, shape, size, texture, etc. of the built-up or other structures of interest.

The utilities may extract all or substantially all candidates (e.g., pixels, components, etc.) and evaluate the candidates based on universal constraints. For instance, if it is specified that a house cannot be less than 16 $m^2$ or larger than 20,000 $m^2$, a building falling outside of these bounds may not be considered by the system while all others may be identified and sorted based on their attributes. In addition to automatically generating maps or footprints of structures of interest, the disclosed utilities may also automatically determine, generate and/or present one or more side deliverables such as any appropriate footprint characteristics (e.g., size and/or shape information), clarity (e.g., contrast) of the structures of interest, density of the structures of interest, edges of the structures of interest (e.g., transition heat-maps from densely to less densely built-up areas), and/or the like. The disclosed utilities may be used in numerous contexts such as in assessing population densities, qualities of life, vulnerability factors, disaster risks, sufficiency of civil infrastructures, economic growth, poverty levels, event monitoring and evolution, change detection in human settlements, urban sprawl monitoring, and the like.

Broadly, the disclosed utilities are configured to organize (e.g., decompose) an input overhead image into a plurality of components of a hierarchical data structure (e.g., an "alpha-tree") based on any appropriate definition or measure of dissimilarity between adjacent pixels of the input image (e.g., maximum pixel intensity, native reflectance, etc.) and then utilize or manipulate the resulting hierarchical data structure in a number of manners to progressively refine, recluster, and/or filter information of the hierarchical data structure to allow for the automatic extraction and presentation of structures of interest from the input overhead image. For instance, a Differential Attribute Profile (DAP) vector field (VF) may be generated for the input overhead image using information from the hierarchical data structure to enrich each pixel with multi-scale information. A number of critical parameters (e.g., component lifetime, component scale, and/or pixel dissimilarity) may be derived from the DAP VF for each of the pixels. Respective image layers may be generated for each of the critical parameters which may be fused together in a number of manners to offer a drastic reduction in the traditional DAP VF and that automatically creates an image segmentation in which the pixels naturally shape up into a plurality of new components such that "dominant" components (e.g., with respect to size, contrast, and/or other attributes) may be automatically perceived to provide a map of built-up footprint candidates.

Non-target (e.g., non-built-up) regions of the input overhead image may be identified in a number of manners. For instance, components of the hierarchical data structure that include highly similar pixels (e.g., in relation to intensity, reflectance) and that represent regions greater than some size threshold (e.g., where non-built-up would most likely be represented by regions greater than the threshold, such as roads, rivers, and or other elongated areas) may be clustered and used to generate a mask for automatically eliminating corresponding portions of the input overhead image. Also, as previously discussed, the pixels in the image layers generated based on the one or more critical parameters (e.g., the lifetime parameters, the scale parameters, etc.) may automatically shape up or cluster into new components (e.g., different than those of the hierarchical data structure) based on similarities between one or more of the critical parameters (e.g., by component lifetime similarities). Geometric attribute filtering may then be performed on geometric attributes of the new components (e.g., contour, smoothness, linearity, entropy, moment invariants, and/or the like) to identify odd-shaped structures that are highly likely to not be of interest (e.g., non-built-up), such as via generation of a mask and application of the mask to the image layer fusion. As a further example, radiometric attributes (e.g., in relation to intensity, reflectance, etc.) of any previously identified non-target portions/candidates may be used to further filter out any remaining portions of the image layer (e.g., image layer fusion) that are likely to be associated with non-target portions (e.g., non-built-up), such as via generation of a rule and application of the rule to radiometric attributes of remaining portions.

The resulting image layers or image layer fusions may be mapped or otherwise projected into a resulting image in any appropriate manner. In one arrangement, the resulting image may be color-coded accorded to the component scale and component lifetime such as by assigning colors to pixels based on respective component scales (e.g., size) and brightness to pixels based on respective component lifetimes. Furthermore, pixels in the resulting image having geometric attributes similar to those of artificial/man-made structures may be displayed more brightly than those pixels less likely to represent artificial/man-made structures to account for possible cross-image instabilities as contrast information is typically extracted on a tile basis instead of on a global basis.

In one aspect, a method for use in extracting structures of interest from overhead imagery data includes identifying, using a processor, a plurality of groups of pixels in at least one input overhead image of a geographical region, where each pixel in each group is adjacent to at least one other pixel in the group, where adjacent pixels in each group do not differ by more than a predetermined level of a dissimilarity measure between the adjacent pixels, where a plurality of such groups of pixels at each of a plurality of successive predetermined levels of the dissimilarity measure are identified, where the groups at one of the predetermined levels are hierarchically related to the groups at an adjacent one of the predetermined levels in a hierarchical data structure (e.g., an alpha-tree), and where each group is a first component. The resulting hierarchical data structure may be manipulated in a number of manners to progressively refine, recluster, and/or filter information of the hierarchical data structure to allow for the automatic extraction and presentation of structures of interest from the input overhead image.

In one arrangement, the method may include tagging, using the processor, each of the first components to identify one of a plurality of area zones within which the first component resides based on a number of pixels present in the first component, where each successive area zone includes first components having a greater number of pixels than do the first components of a previous area zone. This arrangement may also include generating for each pixel of the input overhead image, using the processor, a vector including a number of entries corresponding to each of the area zones from the tagging step, where each entry comprises a difference between a lowest dissimilarity measure level of a first component within which the pixel is disposed in the corresponding area zone and a lowest dissimilarity measure level of a first component within which the pixel is disposed in a subsequent area zone. Information from the vectors may be used to reduce the scale space representation coinciding with the hierarchical data structure to a reduced-band output in which dominant components (e.g., with respect to size and/or other parameters) may be extracted and used to identify possible candidates for structures of interest.

For instance, the method may include determining for each pixel of the input overhead image, using the processor, a largest entry in the vector corresponding to the pixel, where the largest entry is a lifetime parameter. The method may then include clustering pixels of the input overhead image having common respective lifetime parameters into a plurality of corresponding second components. In one variation, the method may include obtaining at least one feature element (e.g., geometric or morphological attribute, such as contour smoothness, linearity, entropy, moment invariants, area, compactness, and/or the like) of each of the second components and ascertaining whether the at least one feature element of each of the second components is associated with a structure of interest in the at least one input overhead image.

To further refine the possible component candidates, the method may include obtaining at least one additional feature element (e.g., radiometric attribute) of each of the second components ascertained to not be structures of interest, obtaining at least one additional feature element (e.g., radiometric) of each of the second components ascertained to be structures of interest, analyzing the at least one additional feature elements of the second components ascertained to be structures of interest in view of the at least on additional feature elements of the second components ascertained to not be structures of interest, and obtaining a subset of the second components ascertained to be of interest based on the analyzing. Thereafter, the pixels of the subset of the second components ascertained to be structures of interest may be mapped into a resultant image that is associated with the geographic area. For instance, the mapped pixels may be color-coded based on the lifetime parameter of the corresponding second component of the mapped pixel.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Figure 1:
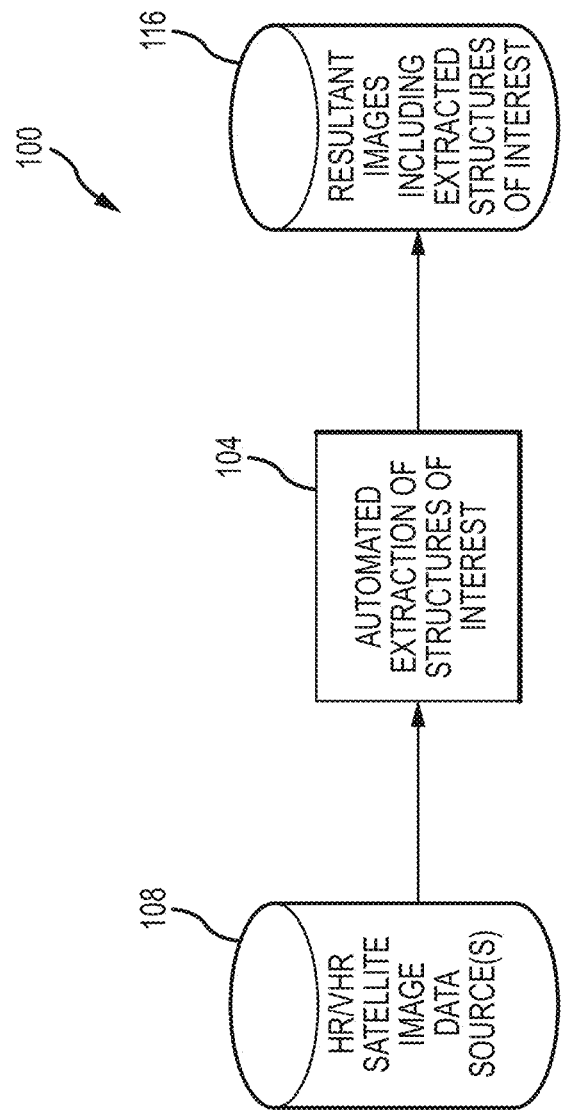
FIG. 1 is a simplified block diagram illustrating a process of extracting structures of interest from overhead imagery data.

Disclosed herein are utilities (e.g., systems, processes, etc.) for automatically extracting or isolating structures or areas of interest (e.g., built-up structures such as buildings, houses, shelters, tents; agricultural areas; etc.) from HR/VHR overhead imagery data by way of making as little as a single pass through a hierarchical data structure of input image components (where pixels are grouped into components based on any appropriate definition or measure of dissimilarity between adjacent pixels of the input image) to identify candidate components (e.g., possible structures of interest) free of necessarily having to re-iterate the same operator configured with different threshold parameters for a plurality of values. One or more critical parameters for each input pixel may be identified based on the components of the hierarchical data structure and then used to generate one or more image layers in which the pixels naturally cluster into new components that facilitates detection of structures of interest (e.g., built-up) in the image layers. Non-target pixels and components (e.g., those that likely do not depict structures of interest) may be identified and/or removed at one or more positions in the process by way of performing any appropriate feature element (e.g., geometric, structural and/or radiometric attribute) filtering in one or more manners. Structures of interest may be mapped or otherwise projected into a resulting image in any appropriate manner. The resultant images can be used in numerous contexts such as in assessing population densities, qualities of life, vulnerability factors, disaster risks, sufficiency of civil infrastructures, economic growth, poverty levels, event monitoring and evolution, and the like.

At the outset, it is noted that, when referring to the earth herein, reference is made to any celestial body of which it may be desirable to acquire images or other remote sensing information. Furthermore, when referring to "overhead" imagery herein, such imagery may be obtained by any spacecraft, satellite, aircraft, and/or the like capable of acquiring images or other remote sensing information. Furthermore, the utilities described herein may also be applied to other imaging systems, including imaging systems located on the earth or in space that acquire images of other celestial bodies. It is also noted that the drawing figures contained herein are not necessarily drawn to scale and that such figures have been provided for the purposes of discussion and illustration only.

Generally, high resolution images of selected portions of a celestial body's surface have become a product desired and used by government agencies, corporations, and individuals. For instance, many consumer products in common use today include images of the Earth's surface, such as Google® Earth. Various types of remote sensing image collection platforms may be employed, including aircraft, earth-orbiting satellites, and the like. In the case of a consumer digital camera, as one non-limiting example, an image sensor is generally arranged in an area array (e.g., 3,000 rows of 3,000 pixels each, or 9,000,000 total pixels) which collects the image area in a single "snapshot." In the case of satellite-based imaging, as another non-limiting example, the "push-broom scanning"

principle is sometimes employed whereby each image sensor includes a relatively small number of rows (e.g., a couple) of a great number of pixels (e.g., 50,000 or more) in each row. Each row of pixels may be scanned across the earth to build an image line by line, and the width of the image is the product of the number of pixels in the row times the pixel size or resolution (e.g., 50,000 pixels at 0.5 meter ground resolution produces an image that is 25,000 meters wide). The length of the image is controlled by the scan duration (i.e. number of lines), which is typically settable for each image collected. The resolution of overhead images varies depending on factors such as the particular instrumentation utilized, the altitude of the satellite's (or other aircraft's) orbit, and the like.

Image collection platforms (e.g., aircraft, earth-orbiting satellites, etc.) may collect or acquire various types of imagery in one or more manners. As one non-limiting example, image collection platforms may perform panchromatic collection of scenes of a celestial body which generally refers to the collection of image data across a single broad range of wavelengths (e.g., all visible light, from near infrared (NIR) to near ultraviolet (NUV), etc.). As another non-limiting example, image collection platforms may additionally or alternatively capture image data within the visible light band and include respective filters to separate the incoming light into red, green and blue portions. As a further non-limiting example, image collections platforms may additionally or alternatively perform multispectral collection of scenes of a celestial body which generally refers to the collection of image data at multiple specific spectral bands across the electromagnetic spectrum (e.g., within bands both inside and outside of the visible light range such as NIR, short wave infrared (SWIR), far infrared (FIR), etc.). For instance, a satellite may have one image sensor that is sensitive to electromagnetic radiation across only a first spectral band (e.g., the visible light band, such as a wavelength range of about 380-750 nm) in addition to one or more additional image sensors that are sensitive to electromagnetic radiation only across other spectral bands (e.g., NIR, 750-1400 nm; SWIR, 1400-3000 nm; etc.). Multi-spectral imaging may allow for the extraction of additional information from the radiance received at a satellite after being reflected from the Earth's surface (which may include atmospheric effects such as from aerosols, clouds, etc.).

As discussed previously, there are generally few global data sets available that could be used to map the human settlements, much less high resolution overhead image data sets (e.g., HR, VHR) that could be used to do so. For instance, current global data sets (e.g., MODIS 500 m, Landscan, Corine Land Cover 2006, etc.) have the tendency to underrepresent small, scattered rural settlements due to their low spatial resolution (e.g., between 500 and 2,000 m). Furthermore, the data sets represent single snap-shots in time that do not allow for regular monitoring. Still further, if the data sets are updated, they are typically not directly comparable due to changing input sources.

Figure 2:
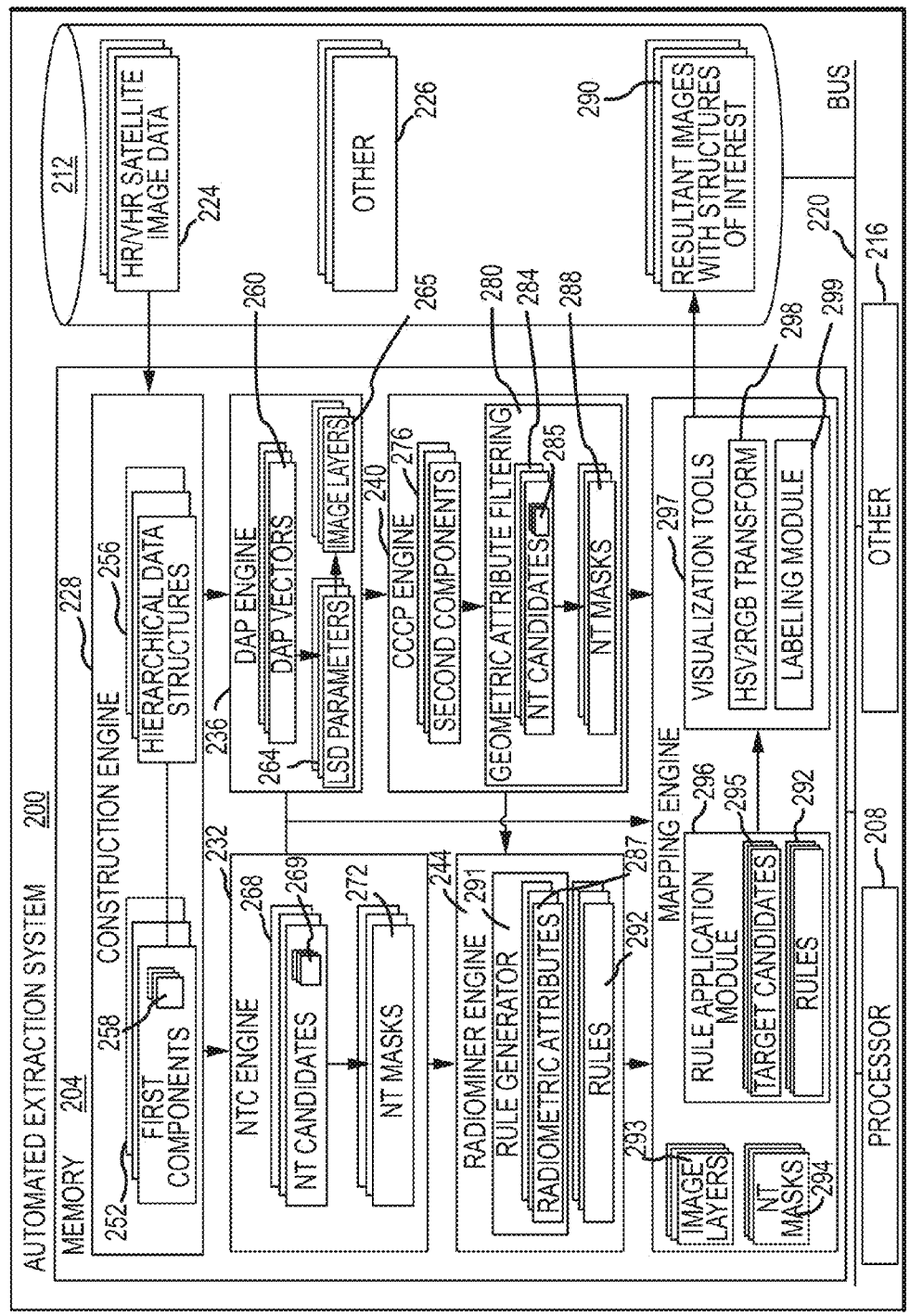
FIG. 2 is a more detailed block diagram of an automated extraction system for obtaining structures of interest from overhead imagery data.

In this regard, FIG. 1 presents a simplified block diagram of a system 100 that may be used to generate and map regionally and globally consistent structures of interest such as human settlements (e.g., including built-up structures) in a manner that is compatible across various imaging sensors and with increased speed and performance in relation to currently available processes. At the heart of the system 100 may be the automated extraction 104 of structures of interest from HR/VHR overhead image data source(s) 108 (e.g., <1-10 m spatial resolution overhead image data obtained by a number of heterogeneous platforms such as SPOT 2 and 5, CBERS 2B, RapidEye 2 and 4, IKONOS® 2, QuickBird 2, World-View 1, 2, and/or 3) and generation of resultant images 116 that include the extracted structures of interest therein. FIG. 2 presents a more detailed block diagram of an automated extraction system 200 that may be used to implement the automated extraction 104 of structures of interest shown in FIG. 1. Although depicted as a single device (e.g., server, workstation, laptop, desktop, mobile device, and/or other computing device), one or more functionalities, processes or modules of the system 200 may be allocated or divided among a plurality of machines, devices and/or processes which may or may not be embodied in a single housing. In one arrangement, functionalities of the server 200 may be embodied in any appropriate cloud or distributed computing environment.

Broadly, the system 200 may include memory 204 (e.g., one or more RAM or other volatile memory modules, etc.), a processing engine or unit 208 (e.g., one or more CPUs, processors, processor cores, or other similar pieces of hardware) for executing computer readable instructions from the memory 204, storage 212 (e.g., one or more magnetic disks or other non-volatile memory modules or non-transitory computer-readable mediums), and/or a number of other components 216 (e.g., input devices such as a keyboard and mouse, output devices such as a display and speakers, and the like), all of which may be appropriately interconnected by one or more buses 220. While not shown, the system 200 may include any appropriate number and arrangement of interfaces that facilitate interconnection between the one or more buses 220 and the various components of the system 200 as well as with other devices (e.g., network interfaces to allow for communication between the system 200 and other devices over one or more networks, such as LANs, WANs, the Internet, etc.).

The system 200 may retrieve any appropriate input overhead image(s) 224 (e.g., HR/VHR overhead image data such as from one or more HR/VHR overhead image data sources 108 of FIG. 1) and store the same in any appropriate form in storage 212 (e.g., such as in one or more databases and manageable by any appropriate database management system (DBMS) to allow the definition, creation, querying, update, and administration of the databases). The processing engine 208 may execute a DBMS or the like to retrieve and load the input overhead image(s) 224 into the memory 204 for manipulation by a number of engines or modules of the system 200 that are discussed in more detail below.

As shown, the system 200 may include a "construction" engine 228 that is broadly configured to construct hierarchical data structures (e.g., alpha-trees) from input overhead images as a way to efficiently organize the pixels of the input overhead images for subsequent processing, a "non-target clustering" (NTC) engine 232 that is broadly configured to cluster together relatively large image regions represented by the alpha tree that are highly likely to identify non-target regions or candidates (e.g., areas that are likely not structures of interest, such as water, vegetation, roads, rivers, etc.), a "Differential Area Profile" (DAP) engine 236 that is broadly configured to generate DAP vectors for each pixel and then identify a number of critical parameters for each pixel based on its DAP vector, a "constrained connected component processing" (CCCP) engine 240 that is broadly configured to cluster the pixels into a plurality of new components based on at least one of their critical parameters and then perform any appropriate geometric or structural attribute filtering on the components to identify target and non-target candidates, a "radiominer" engine 244 that is configured to facilitate any appropriate attribute radiometric filtering on target candidates, and a "mapping" engine 248 that is configured to present target candidates (e.g., components that identify structures of interest) in any appropriate manner in one or more resultant images.

Each of the engines (and/or other engines, modules, logic, etc. disclosed and/or encompassed herein) may be in the form of one or more sets of computer-readable instructions for execution by the processing unit 208 and that may be manipulated by users in any appropriate manner to perform automated extraction and presentation of structures of interest (e.g., built-up layers or the like) on a display (not shown). In this regard, the combination of the processor 208, memory 204, and/or storage 212 (i.e., machine/hardware components) on the one hand and the various engines/modules disclosed herein in one embodiment create a new machine that becomes a special purpose computer once it is programmed to perform particular functions of the extraction utilities disclosed herein (e.g., pursuant to instructions from program software). In one arrangement, any appropriate portal in communication with the various engines may run on the system 200 and be accessible by users (e.g., via any appropriate browser) to access the functionalities of the system 200. While the various engines have been depicted in FIG. 2 as being separate or distinct modules, it is to be understood that the functionalities or instructions of two or more of the engines may actually be integrated as part of the same computer-readable instruction set and that the engines have been depicted in the manner shown in FIG. 2 merely to highlight various functionalities of the system 200. Furthermore, while the engines have been illustrated as being resident within the (e.g., volatile) memory 204 (e.g., for execution by the processing engine 208), it is to be understood that the engines may be stored in (e.g., non-volatile) storage 212 (and/or other non-volatile storage in communication with the system 200) and loaded into the memory 204 as appropriate.

Figure 3:
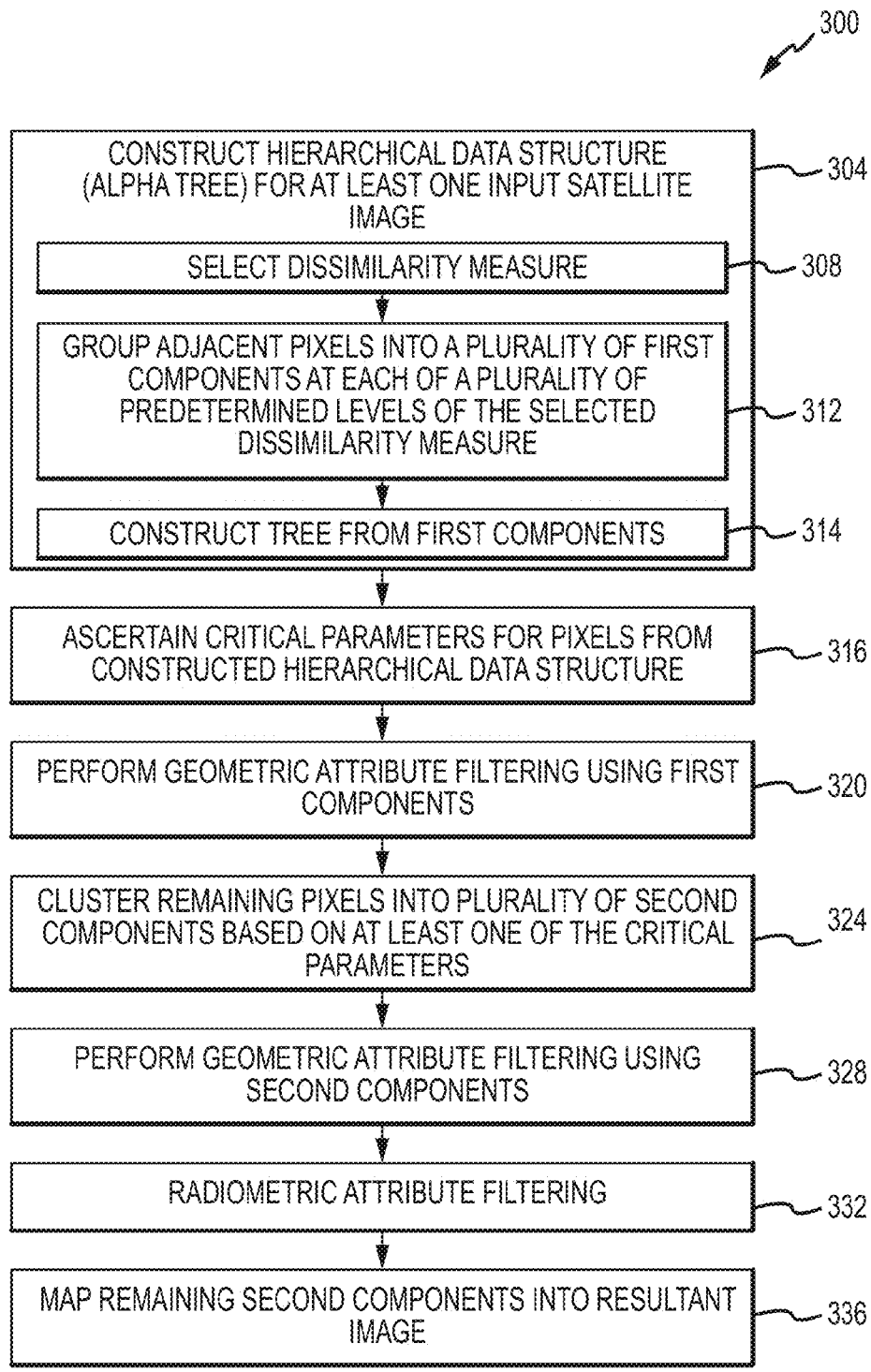
FIG. 3 is a flow diagram of a method for extracting structures of interest from overhead imagery data.

To facilitate the reader's understanding of the various engines of the system 200, additional reference is now made to FIG. 3 which illustrates a method 300 for use in performing the automated extraction processes disclosed herein. While specific steps (and orders of steps) of the method 500 have been illustrated and will be discussed, other methods (including more, fewer or different steps than those illustrated) consistent with the teachings presented herein are also envisioned and encompassed within the present disclosure.

Figure 11:
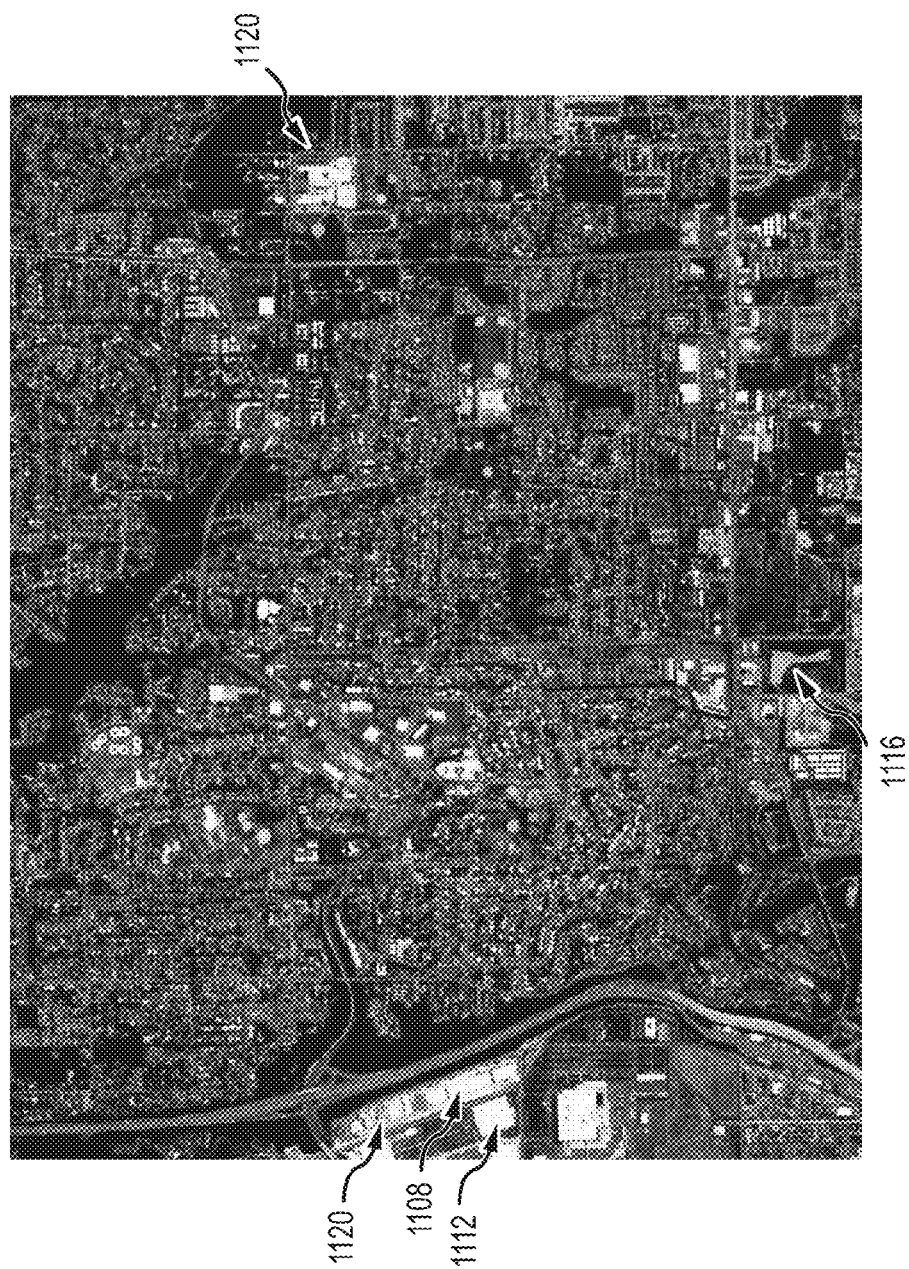
FIG. 11 illustrates multispectral imagery acquired by the WorldView 2 satellite over a portion of Seattle, Wash.

The method 300 may begin by constructing 304 a hierarchical data structure (e.g., alpha-tree) from the pixels of one or more HR/VHR input overhead images of a particular geographic area. Stated differently, the one or more input overhead images may be decomposed into nodes or components (e.g., each include a single pixel or a group of pixels that collectively define the input images as whole) of a hierarchical data structure that generally maps image partitions from fine to course. With reference to FIG. 2, for instance, the construction engine 228 of the automated extraction system 200 may receive one or more input overhead images 224 of a particular geographic area (e.g., WorldView 2 multispectral imagery acquired over Seattle, Wash. as shown in FIG. 11) and break the input overhead image(s) 224 down into a plurality of "first" components 252 (e.g., nodes or groups of pixels related by one or more appropriate metrics, parameters, etc.). The construction engine 228 then appropriately organizes or arranges the various first components 252 into a hierarchical data structure 256 whereby each first component 252 is hierarchically (e.g., ancestrally) related to at least one other first component 252. In one arrangement, each hierarchical data structure 256 may be a rooted, uni-directed tree with its leaves corresponding to reference connected components (e.g., where each includes pixels that are identical in relation intensity and/or the like) of the at least one input overhead image and the root corresponding to the tip of the hierarchy (e.g., the single component whose extent defines the image definition domain).

Figure 4:
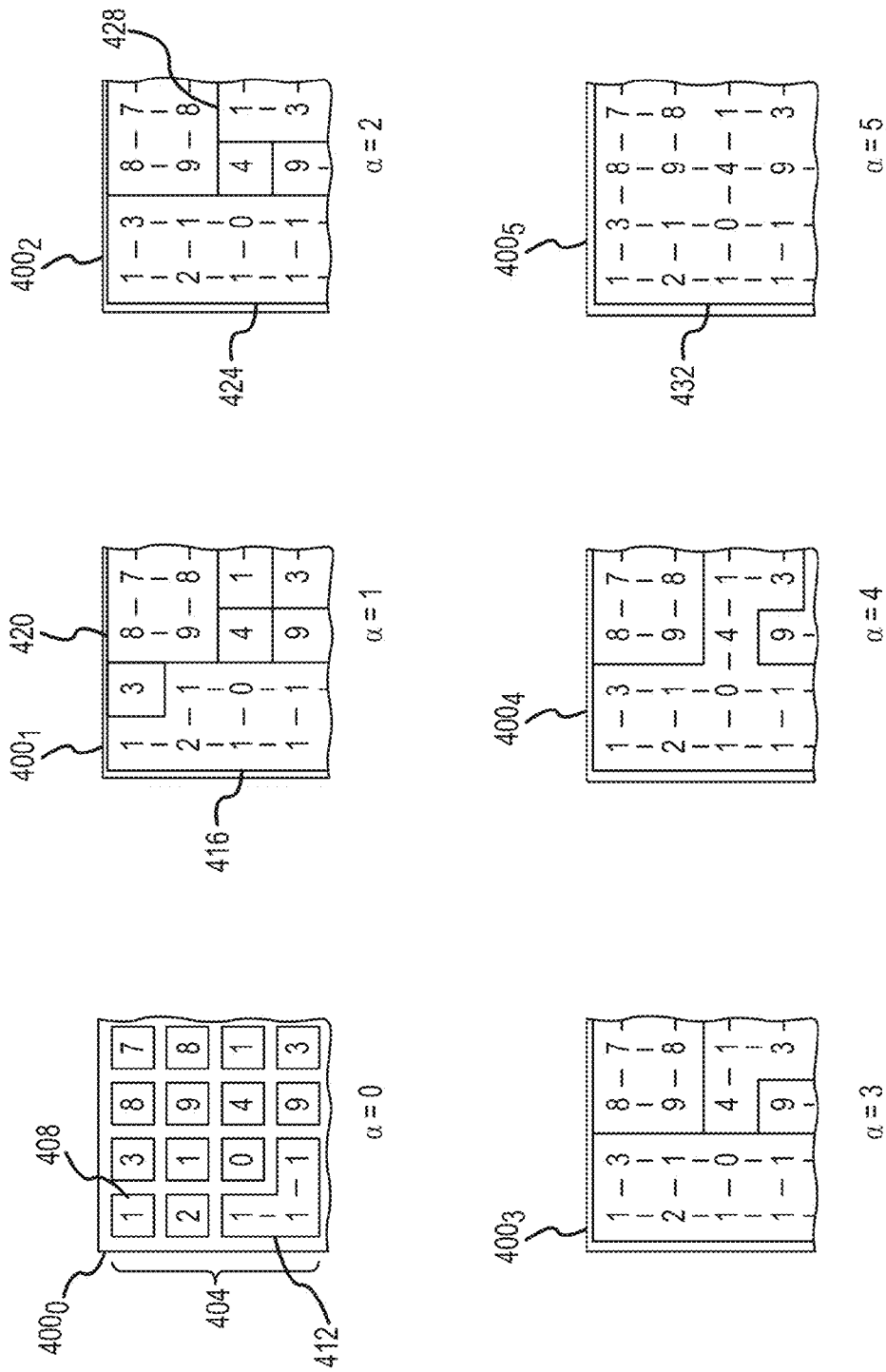
FIG. 4 is a schematic diagram of a plurality of pixel partitioning matrices corresponding to a plurality of successive predetermined levels of a dissimilarity measure for use in building an alpha-tree for at least one input overhead image.

To better understand the step of constructing 304 a hierarchical data structure 256 from the pixels of the at least one input overhead image 224, additional reference is now made to FIG. 4 which presents a plurality of pixel partitioning matrices 400 (e.g., matrices $400_0$, $400_1$, $400_2$, $400_3$, $400_4$, $400_5$) corresponding to a plurality of successive predetermined levels of a dissimilarity measure for use in building an alpha-tree (e.g., a hierarchical data structure 256) for at least one input overhead image. Generally, each matrix 400 includes a plurality of rows and columns of pixels 404 of the one or more input overhead images 224 (only 16 shown in FIG. 4 in the interest of clarity) and arranged in a native format (e.g., in the same manner as the corresponding photosites of the image sensor(s)). As shown in FIG. 3, one step of the construction step 304 may be selecting 308 at least one dissimilarity measure by which to group adjacent ones of the pixels 404 to form first components 252 of the hierarchical data structure 256 (where such adjacent pixels 404 do not differ by more than alpha according to the dissimilarity measure at each of a plurality of different alphas). For instance, dissimilarity measures may include the maximum pixel intensity difference between adjacent pixels, the maximum spectral angular distance difference between adjacent pixels, native reflectance difference, and/or the like. Such differences may be computed from a single band in the case of one or more panchromatic images, from all bands available in the case of one or more multispectral images, and/or the like.

The method 300 may also include grouping 312 (e.g., clustering) adjacent pixels (e.g., that border each other in either the "horizontal" or "vertical" direction of the matrix) into a plurality of components at each of a plurality of predetermined levels (e.g., alphas) of the selected dissimilarity measure and then constructing 314 the hierarchical data structure 256 from the components. Returning to FIG. 4, each pixel 404 includes or is associated with a value 408 (e.g., pixel intensity such as grayscale value) by which a level of dissimilarity between the pixel 404 and each adjacent pixel 404 will be measured. In each matrix 400, pixels 404 may be grouped into components based on one of a plurality of predetermined levels of the dissimilarity measure (e.g., where each level corresponds to a different alpha ($\alpha$)). In matrix $400_0$ (e.g., corresponding to $\alpha=0$) for instance, pixels 404 are grouped with adjacent pixels 404 to form components only when their respective values 408 differ by no more than zero (or, in other words, only when their values 408 are equal). In the event that a particular pixel 404 does not include any adjacent pixels 404 with equal values 408, the particular pixel 404 may form a component that includes only the particular pixel 404. As shown in this example, the matrix $400_0$ includes a single multi-pixel component 412 (including three adjacent pixels 404 all having values 408 of one) and a plurality of single-pixel components (not labeled, but each such component being represented by its respective pixel 404).

With reference now to matrix $400_1$ (e.g., corresponding to $\alpha=1$), pixels 404 are grouped with adjacent pixels 404 to form components only when their respective values 408 differ by no more than one (or, in other words, only when their values 408 are equal or differ by one). In this regard, the matrix $400_1$ includes a number of new components such as a new component 416 that includes all the pixels 404 of the component 412 from the matrix $400_0$ in addition to a plurality of additional adjacent pixels 404 whose values 408 are different than that of at least one of the pixels of the component 412 by no more than one. See FIG. 4. The matrix $400_1$ also includes a new component 420 that includes four pixels (previous single-pixel components in the matrix $400_0$), where the values 408 of adjacent pixels 404 in the new component 420 differ by no more than one. As shown, five components (all single-pixel components with values 408 of 3, 4, 1, 9 and 3; not labeled) remain unchanged between matrix $400_0$ and $400_1$. In one arrangement, a component may only be considered part of a particular matrix 400 when the component has changed since the preceding matrix 400. In this case, the five aforementioned single-pixel components may not be considered part of the matrix $400_1$.

With reference to matrix $400_2$ (e.g., corresponding to $\alpha=2$), pixels 404 are grouped with adjacent pixels 404 to form components only when their respective values 408 differ by no more than two. In this regard, the matrix $400_2$ includes a new component 424 (including all pixels 404 of component 416 from matrix $400_1$ in addition to an additional adjacent pixel 404) and another new component 428 including two pixels whose values 408 (e.g., 1 and 3) are no more than two different from each other. The other remaining pixels in the matrix $400_2$ are part of components that did not change (e.g., did not gain pixels) from the matrix $400_1$ and thus may not form components of the $400_2$. A similar clustering of pixels 404 based on the differences of their values 408 to form new components may be performed in matrix $400_3$ corresponding to $\alpha=3$, matrix $400_4$ corresponding to $\alpha=4$, matrix $400_5$ corresponding to $\alpha=5$, and/or a plurality of additional matrices at respective additional alpha levels until all pixels are included in the same component (e.g., a root component 432 or node, such as is represented in matrix $400_5$). While the dissimilarity evaluation has been discussed in the context of vertical and horizontal neighbors of a particular pixel, it is to be understood that the dissimilarity evaluation may alternatively or additionally be made in relation to diagonal neighbors of a pixel (e.g., top-left, top-right, bottom-left, bottom-right), such as when increased granularity of components is required. As another example, one or more small neighborhoods of pixels (e.g., the first 24 pixels) around a particular pixel under study may be considered.

Figure 5:
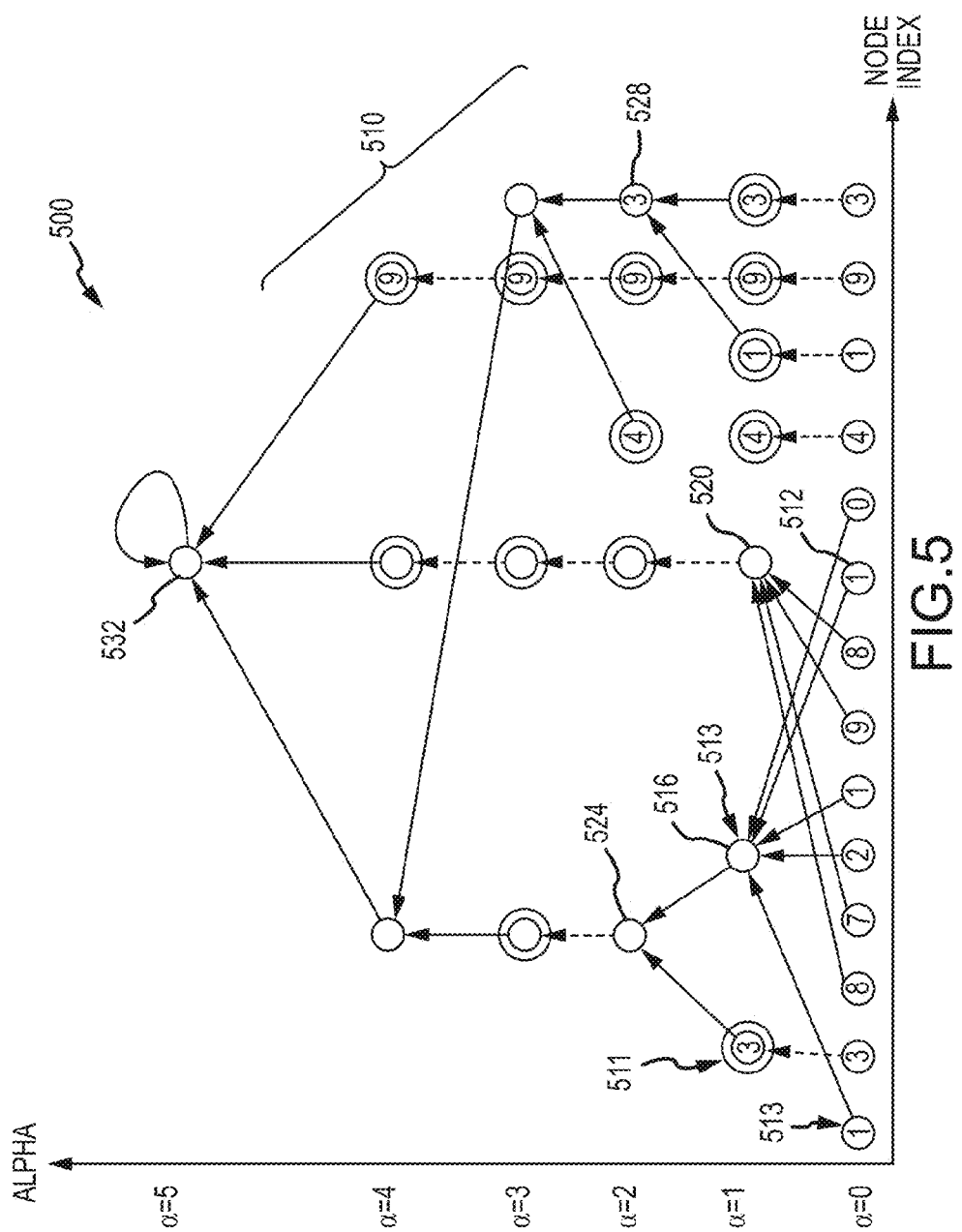
FIG. 5 is an alpha partition pyramid built from the partitioning matrices illustrated in FIG. 4.

Turning now to FIG. 5, an alpha partition pyramid 500 that may be constructed 314 from the components of the pixel partitioning matrices 400 of FIG. 4 is illustrated. In one arrangement, the vertical axis of the alpha partition pyramid 500 may correspond to the plurality of respective alpha levels of the plurality of pixel partitioning matrices 400 (e.g., $\alpha=0$, 1, 2, etc.) while the horizontal axis may correspond to any appropriate index by which to identify nodes 510 at a particular alpha level (where each node 510 identifies a respective component of one of the pixel partitioning matrices 400). It is noted that the terms nodes and components may be used interchangeably herein. Furthermore, it will be appreciated that many more complicated predetermined alpha levels may be utilized based on the particular dissimilarity measure being utilized. In any case, at $\alpha=0$ for instance, nodes 510 corresponding to each of the components from the matrix $400_0$ may be respectively disposed along the horizontal axis in any appropriate manner. In one arrangement, components may be selected from the matrix $400_0$ for placement as nodes 510 in the alpha partition pyramid 500 starting with the leftmost component in the top row of pixels 404 and moving to the end of the row before starting with the leftmost component in the next row of pixels 404. If a component includes two or more pixels 404, the component may only be registered as a node 510 in the alpha partition pyramid 500 a single time. As shown in FIG. 5, all of the nodes 510 at $\alpha=0$ correspond to the single-pixel components of the matrix $400_0$ with the exception of node 512 which corresponds to the multiple-pixel component 412 of matrix $400_0$.

At $\alpha=1$ which corresponds to matrix $400_1$, for instance, a number of observations may be made. As discussed previously, five components (all single-pixel components with values 408 of 3, 4, 1, 9 and 3; not labeled) remain unchanged between matrix $400_0$ and $400_1$. In this regard, the nodes 510 corresponding to these components are represented by concentric circles (or the like) at $\alpha=1$ which indicates that such nodes 510 are "non-included" nodes 511 at $\alpha=1$ (i.e., they are not to be considered nodes at $\alpha=1$ as they are redundant in relation to the $\alpha=0$ level). However, the nodes 511 may still form part of "included" nodes 513 (represented as single circles or the like) at later alpha levels. In this regard, it may be noted that an alpha tree of the alpha partition pyramid 500 would be similar to the alpha partition pyramid 500 but free of any non-included (e.g., redundant) nodes 511. For instance, in a corresponding alpha tree, the arrow currently drawn from the node corresponding to the first single-pixel component with a value of "3" would be drawn from the $\alpha=0$ level directly to node 524 at the $\alpha=2$ level.

In any event, and as also shown in FIG. 5, the $\alpha=1$ level includes two included nodes 513 which are labeled as 516 and 520 that respectively correspond to components 416 and 420 from $400_1$ of FIG. 4. In the case of node 516, for instance, it can be seen how a number of arrows (e.g., lines, connectors, etc.) may be drawn from a respective number of the nodes 510 at the $\alpha=0$ level to node 516 at the $\alpha=1$ level to indicate their inclusion in the node 516 at the $\alpha=1$ level (which corresponds to the merging of component 412 and the plurality of single-pixel components of matrix $400_0$ into a single component 416 in matrix $400_0$. Arrows or the like may be similarly depicted from each of a number of respective nodes at the $\alpha=0$ level to node 520 at the $\alpha=1$ level.

A similar process may be performed to create additional included nodes 513 labeled as nodes 524 and 528 at the $\alpha=2$ level (that correspond to components 424 and 428 from matrix $400_2$ of FIG. 4) and at further alpha levels (nodes not labeled in the interest of clarity) up to a root node 532 at the $\alpha=5$ level (that corresponds to component 432 from matrix $400_5$ of FIG. 4) that includes the pixels of all components of the alpha partition pyramid 500 (and that points to itself as shown in FIG. 5). As shown, the alpha partition pyramid 500 may include a plurality of paths or branches extending between each of the nodes 510 at the $\alpha=0$ level and the root node 532 at the $\alpha=5$ level. In one arrangement, the construction engine 228 may, after construction of the alpha partition pyramid 500, ascertain any appropriate feature elements or attributes 258 (e.g., structural, geometric, radiometric, statistical, etc.) of the various first components 252 (e.g., nodes) of the hierarchical data structure 256 (e.g., of the various nodes 510 of the alpha partition pyramid 500) in any appropriate manner for use in later processing as will be discussed below. In the case of node 512 in FIG. 5, for instance, the construction engine 228 may determine an area or non-compactness collectively represented by all of the pixels 404 included in the component 412 of matrix $400_0$. The same area or non-compactness value may then be used as part of determining the area or non-compactness of node 516 (where node 516 includes all the pixels 510 of node 512 in addition to a number of other nodes/pixels). A similar process may be performed to determine attributes of the remaining nodes/components of the alpha partition pyramid 500. In one arrangement, all nodes/components may be processed starting at the $\alpha=1$ level and continuing through the $\alpha=5$ level (associated with the root node 532).

Figure 8:
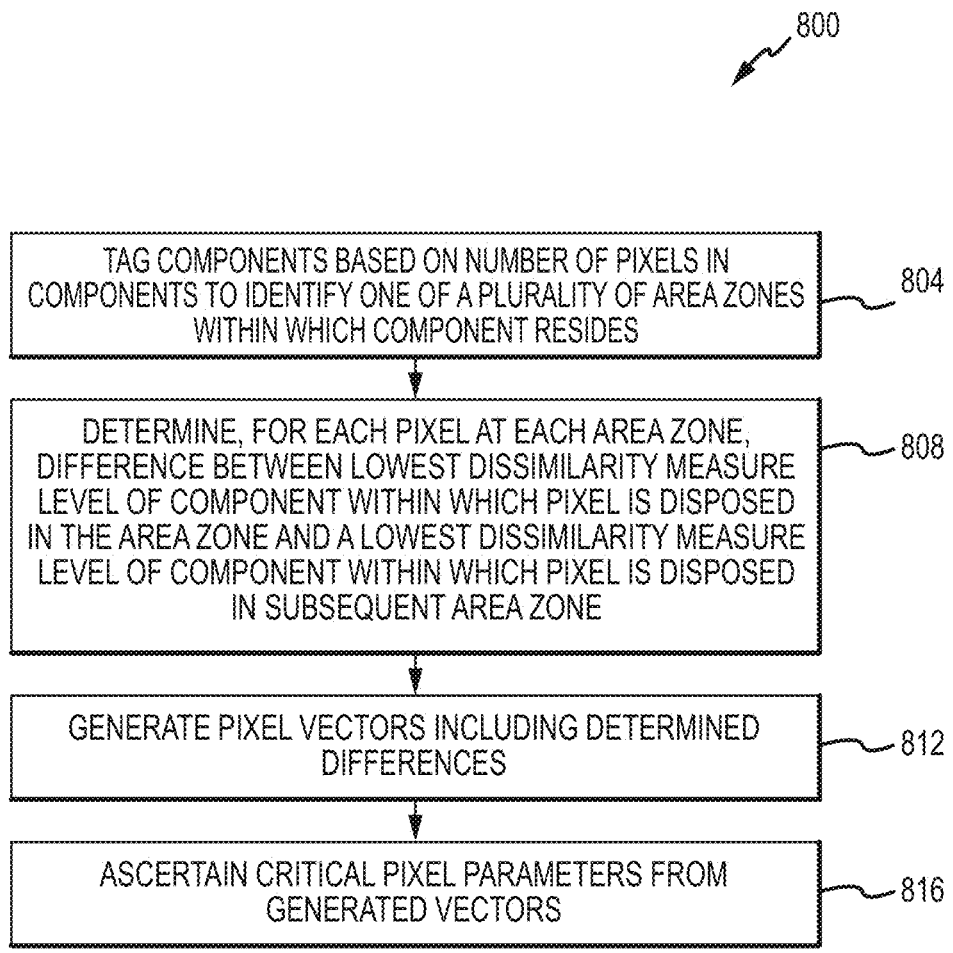
FIG. 8 is a flow diagram of a method for obtaining critical parameters of pixels of an alpha tree.

Returning to FIG. 3, the method 300 may also include ascertaining 316 (e.g., by DAP engine 236) critical parameters (e.g., attributes) for pixels of the constructed hierarchical data structure 256 (e.g., the alpha partition pyramid 500) that allows for a reduction in the attribute scale space representation of the hierarchical data structure 256 and that automatically creates an image segmentation in which "dominant" nodes or components may be extracted from the hierarchical data structure 256 to at least begin to shape up a map of "target" candidates (e.g., pixels or components representing structures of interest, such as built-up). To more fully understand the ascertaining step 316, reference is now made to FIG. 8 which presents a method 800 of obtaining critical parameters of pixels of an alpha tree (or other hierarchical data structure) as well as to FIG. 6 which illustrates a pixel propagating through various components of a portion of an alpha tree and showing various "area zones" within which are located various ones of the components through which the pixel propagates.

Figure 6:
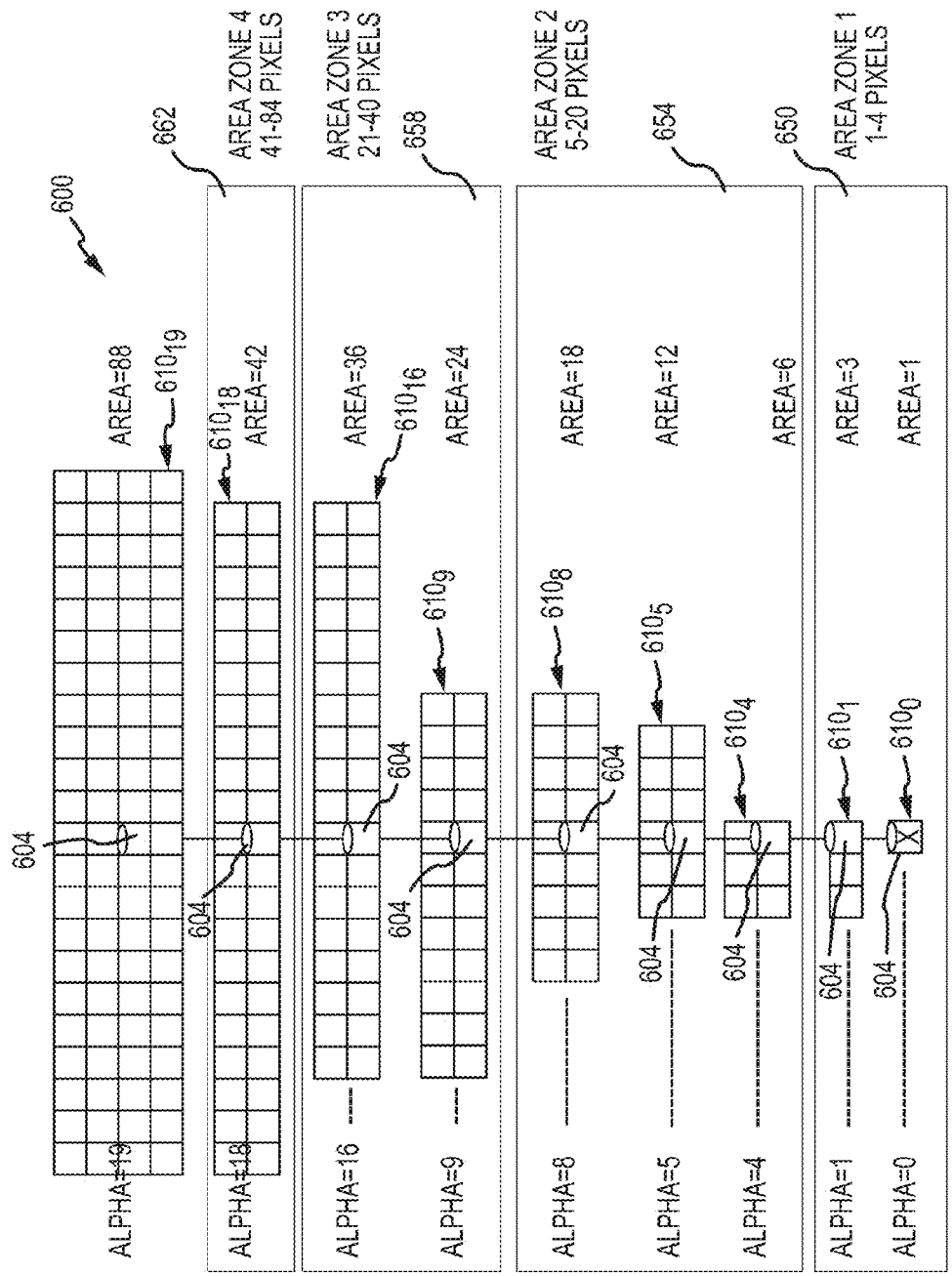
FIG. 6 is a schematic diagram illustrating a pixel propagating through various components of a portion of an alpha tree and showing various "area zones" within which are located various ones of the components through which the pixel propagates.

At step 804, the DAP engine 236 may tag components (e.g., nodes) based on a number of pixels in the components to identify one of a plurality of "area zones" within which the components reside. As shown in FIG. 6, a branch 600 of an alpha tree is illustrated (e.g., where the alpha tree is more complicated than the alpha tree 500 of FIG. 5) and shows a particular pixel 604 as the pixel 604 propagates through various "included" components of the branch 600 (i.e., components that gained at least one pixel in relation to an immediately preceding component). For instance, the pixel 604 may form a single-pixel component $610_0$ at the $\alpha=0$ level and then form part of a multi-pixel component $610_1$ at the $\alpha=1$ level (e.g., where the component $610_1$ includes three total pixels represented by squares). After the component $610_1$, the pixel 604 does not, in this example, form part of another component until it joins a multi-pixel component $610_4$ at the $\alpha=4$ level implying that no new pixels were added to the component $610_1$ at the $\alpha=2$ level or the $\alpha=3$ level (e.g., similar to how no pixels were added to "non-included" component 511 of FIG. 5 (having a single pixel with a value of "3") at the $\alpha=1$ level resulting in the component 511 not being considered as part of the branch or path between the $\alpha=0$ level and the $\alpha=5$ level). As shown, the pixel 604 may continue to be clustered or grouped into additional components up the tree (e.g., components $610_5$, $610_8$, $610_9$, $610_{16}$, $610_{18}$ and $610_{19}$) which may or may not be disposed at successive alpha levels (depending on, as discussed herein, whether or not a size of the component changed from one alpha level to the next alpha level). While values (e.g., values 408) have not been shown, it is assumed for purposes of discussion that adjacent pixels in each component have values that are no more dissimilar than the particular alpha level at which the component is disposed.

With continued reference to FIG. 6, each of the components 610 may be tagged to identify a particular area zone within which the component 610 resides that generally conveys a relative size (in pixels) of the component (e.g., where each area zone includes components having a particular number or number range of pixels). In this example, four area zones may be specified, where a first area zone 650 includes components having 1-4 pixels, a second area zone 654 includes components having 5-20 pixels, a third area zone 658 includes components having 21-40 pixels, and a fourth area zone 662 includes components having 41-84 pixels. Of course, additional or fewer area zones associated with different pixel ranges than shown in FIG. 6 are envisioned and encompassed herein. In any case, components $610_0$ and $610_1$ may be tagged with the first area zone 650 (as each includes between 1-4 pixels), components $610_4$, $610_5$ and $610_8$ may be tagged with the second area zone 654 (as each includes between 5-21 pixels), and so on.

Once the particular area zone within which each component resides has been determined, the method 800 may proceed to determine 808, for each area zone, a difference between a) a lowest alpha level (e.g., lowest predetermined level of the dissimilarity measure) of a component within which the pixel 604 is disposed in the area zone, and b) a lowest alpha level of a component within which the pixel 604 is disposed in a subsequent area zone (e.g., the next area zone). The determined differences may then be used to generate DAP vectors 260 (see FIG. 2) for each pixel. Generally, a DAP is a point-based multi-scale descriptor used in pattern analysis and image segmentation and may be defined through sets of size-based or other attribute-based segmentations of an alpha-tree of the one or more input overhead images. Operations on a DAP vector field (VF) or individual DAP vectors for some or all pixels of the one or more input overhead images can be computed free of necessarily first exporting the DAP VF (e.g., via the "one-pass method").

In the case of the first area zone 650, for instance, the difference would be the difference between the alpha of component $610_4$ and the alpha of component $610_0$ or, in other words, four. In the case of the second area zone 654, for instance, the difference would be the difference between the alpha of component $610_9$ and the alpha of component $610_4$ or, in other words, five. In the case of the third area zone 658, for instance, the difference would be the difference between the alpha of component $610_{18}$ and the alpha of component $610_9$ or, in other words, nine. In the case of the fourth area zone 662, for instance, the difference would be the difference between the alpha of component $610_{19}$ and the alpha of component $610_{18}$ or, in other words, one. While not labeled, component $610_{19}$ may be disposed within a fifth (e.g., residual) area zone.

A vector (e.g., DAP vector) may then be generated 812 including entries that correspond to the aforementioned determined differences. In the case of the pixel 604 (e.g., represented by the variable "x"), the following vector may be generated:

$$DAP(x)=[4, 5, 9, 1]$$

The determining step 808 and generating step 812 may be performed for at least some or all pixels of the one or more input overhead images and combined into a vector field (e.g., a DAP VF) in any appropriate manner for subsequent processing. It is to be understood that a DAP vector of a pixel in reality may include many more than the four entries shown in the DAP vector of the pixel 604 (e.g., as alpha trees for input images including millions and millions of pixel may require many more area zones than are shown in FIG. 6). Furthermore, it will be appreciated that the specific paths or branches followed by each pixel may be at least partially different than those followed by other ones of the pixels (e.g., except in the case of two or more pixels forming part of the same component at an $\alpha=0$ level). With reference back to FIG. 6, for instance, another pixel may initially form part of one or more different components in the first area zone 650 but then may join component $610_5$ along with the pixel 604 at the $\alpha=5$ level in the second area zone 654. As another example, another particular pixel may not join with the pixel 604 until it reaches the root component/node $610_{19}$.

Once the various DAP vectors and/or DAP VF have or has been generated 812, the method 800 may include ascertaining 816 one or more critical parameters (e.g., LSD parameters 264 in FIG. 2) for each of the pixels from their respective DAP vectors in any appropriate manner. One critical parameter referred to herein as a "lifetime" (L) parameter is the largest entry in the DAP vector and conveys a contrast equivalent notion of the maximal dissimilarity between all consecutive pairs of largest components to which a pixel belongs in the given multi-scale DAP decomposition of the image. A largest component is the component of an area zone defined at the highest possible value of alpha and still being of an area (e.g., pixel count) that matches the upper bound of the given area zone. Another critical parameter referred to herein as a "scale" (S) parameter is the first area zone, in ascending order, at which L was first encountered and may generally convey the dominant scale or zone of the DAP decomposition for each pixel. Another critical parameter referred to herein as a "dissimilarity" (D) parameter is the alpha value of the smallest component of the lowest area zone (in ascending order) to which a given pixel belongs and from which L was ascertained. The parameter D may generally convey an indication of regional smoothness in the resulting segmentation. In the case of the pixel 604 in FIG. 6, the L, S and D parameters of the pixel 604 (e.g., represented by the variable "x") may be as follows:

L(x)=9 (see the third entry in DAP(x));
S(x)=3 (the area zone corresponding to the third entry in DAP(x)); and
D(x)=9 (the lowest alpha level in the third area zone).

Output image layers 265 that respectively include the L, S and D parameters for the various pixels (and that naturally shape up the pixels therein into a number of connected second components 276 as discussed below) may be respectively generated and used in various manners to obtain information of interest from and/or present different visual appearances of the one or more input overhead images. For instance, the L, S and D layers may be fused into a single three-band model referred to herein as the "LSD" model to provide a drastic reduction of the DAP VF for use in image segmentation and semantic visualization (e.g., from what may be hundreds or even more of entries in a DAP vector for a pixel due to what may be hundreds or even more area zones through which the pixel propagates). In one arrangement, the L, S and D layers may be passed from the DAP engine 236 to the mapping engine 248 whereby the layers may be appropriately combined into a resultant image 290 and displayed for use by analysts and the like. For example, any appropriate Hue-Saturation-Value (HSV) transform/logic or the like may function to produce a color output whereby hue is mapped to the S layer (where the hue of a particular pixel or component changes based on its S value), value is mapped to L (where the value of a particular pixel or component changes based on its L value), and where saturation is constant. As another example, color may be mapped directly to the S layer and color strength value (e.g., dark color value to bright color value) may be mapped to the L layer. See FIG. 13.

As a further example, the L layer may be substituted with one or more geometric descriptors of connected components shaped within the L layer and consisting of iso-intensity pixels to reduce the occurrence of cross-image instabilities, present stable color representations, and enhance the appearance of structures of interest (e.g., built-up, such as three-dimensional man-made structures or the like) relative to portions of the image that are not structures of interest (e.g. non-man-made 3D structures, rivers, roads, etc.). For instance, one arrangement includes generating a compactness or a contour smoothness layer based on the respective attributes of the iso-intensity connected components shaped within the L layer (e.g., where high levels of component compactness would be more likely to signify a structure of interest such as built-up, in contrast to an elongated road or river which would be associated with lower levels of compactness). This example is referred to herein as the Attribute-Scale-Dissimilarity (ASD) model. See FIG. 14.

Before or as part of mapping any of the aforementioned layers and/or additional layers into one or more resultant images 290, one or more filtering procedures may be performed on the pixels, components, layers, and/or the like to progressively identify and remove pixels, components, layers, etc. that are highly likely to be "non-target" candidates (e.g., not associated with structures of interest) so as to further refine a group of "target" candidates in the resultant images 290 of the geographic area corresponding to the one or more input overhead images 224 (e.g., pixels/components highly likely to identify structures of interest). In one arrangement, at least one of such filtering procedures may generate at least one non-target "mask" (e.g., a layer corresponding to the geographical area of the one or more input overhead images where first, white regions (e.g., logical "1") correspond to regions that are target regions/candidates (or are likely target candidates) and where second, black regions (e.g., logical "0") correspond to regions that are non-target regions/candidates (or are likely non-target candidates)). In this regard, application of such non-target masks to one or more of the image layers (e.g., an L-S-D image layer fusion; an A-S-D image layer fusion, etc.) may serve to automatically remove non-target regions from the one or more resultant images 290 (e.g., or from the one or more input overhead images themselves). In one arrangement, a plurality of the non-target masks may be fused into a single "fusion" mask (e.g., as shown in FIG. 11) that may be applied over, for instance, the L, S, and D layer fusion to automatically remove non-target portions of the fusion.

Figure 9:
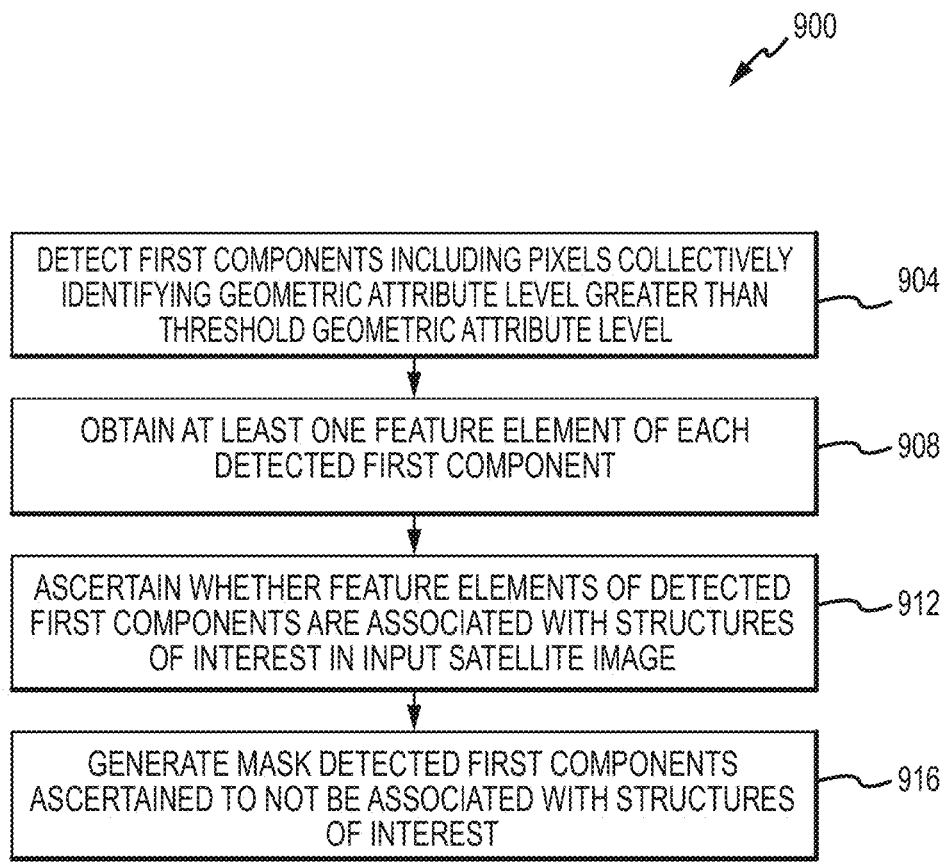
FIG. 9 is a flow diagram of a method for identifying non-target pixels in at least one input overhead image through use of geometric attribute filtering and generating a corresponding mask for isolating target candidates in the at least one input overhead image.

Returning to FIG. 3, the method 300 may include, for instance, performing geometric attribute filtering 320 with the first components 252 to remove non-target pixels and/or components from the one or more resultant images 290. With particular reference now to FIG. 9, a method 900 for performing such geometric attribute filtering 320 using first components and generating a corresponding mask (e.g., via the NTC engine 232) is presented. Broadly, the NTC engine 232 may be configured to cluster regions that are highly likely to be non-target candidates. At 904, the NTC engine 232 may proceed to detect first components 252 of the hierarchical data structure 256 that each collectively identify a geometric attribute level (e.g., size, non-compactness, etc.) that is greater than a threshold level for the geometric attribute. In the case of size, for instance, it may be assumed that structures of interest such as built-up may generally not exceed a certain size (e.g., area) threshold. For instance, first components 252 that are greater than a certain area threshold (e.g., as just one non-limiting example, 20,000 m$^2$ may identify features such as water, vegetation, bare soil, and/or the like). In the case of non-compactness, for instance, it may be assumed that structures of interest such as built-up may generally not exceed a certain non-compactness threshold (e.g., as higher levels of non-compactness indicate highly elongated objects road networks, rail-lines, rivers, streams, etc., all of which would generally not be associated with three dimensional man-made structures such as buildings, houses, tents, etc.).

To reduce the likelihood of false positives, the NTC engine 232 may, in one arrangement, limit its focus to first components 252 at relatively low levels of alpha in the hierarchical data structure 256 (where all pixels in such components would be highly similar to each other in relation to the dissimilarity measure, such as in relation to intensity/grayscale or the like). For instance, the NTC engine 232 may analyze all "included" nodes 513 (e.g., components) at the α=0 and 1 levels in the alpha partition pyramid 500 of FIG. 5 (e.g., which would include all nodes at the α=0 level and nodes 516 and 520 at the α=1 level) and determine whether any of such nodes represented an area on the ground greater than a threshold area (e.g., as determined by the number of pixels included in the component multiplied by the spatial resolution of the image sensor).

The resulting segmentation performed by the NTC engine 232 may yield a set of relatively homogeneous regions (i.e., the detected 904 first components) some of which may be target candidates (e.g., structures of interest, such as built-up) and some of which may not be non-target candidates (e.g., not structures of interest, such as non-built-up). To identify non-target candidates 268 (shown in FIG. 2), the method 900 of FIG. 9 may proceed to obtain 908 at least one attribute (e.g., feature elements such as contour-smoothness, linearity, entropy, moment invariants, and/or the like) of each of the detected 904 first components and then ascertain 912 whether the attributes are (e.g., likely are) or are not (e.g., are likely not) associated with structures of interest in the one or more input overhead images (e.g., via attribute filtering).

Figure 12:
FIG. 12 illustrates a mask for use in automatically removing non-target portions of the plurality of multispectral images of FIG. 11.
Figure 13:
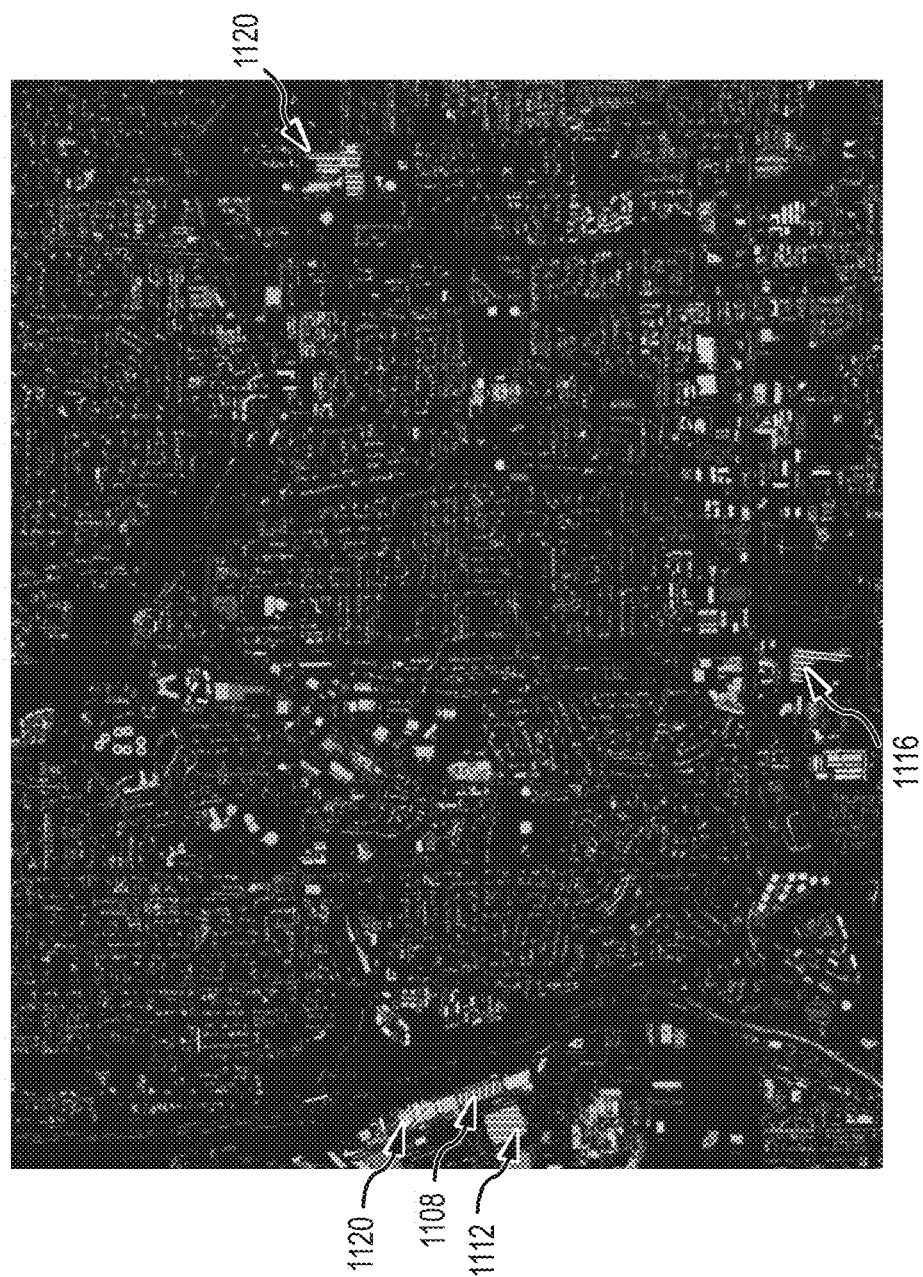
FIG. 13 illustrates a fusion of critical parameter layers of the plurality of multispectral images of FIG. 11 after the mask of FIG. 12 was used to automatically remove non-target portions of the image.

A non-target mask 272 may then be generated 916 by the NTC engine 232 to filter out non-target pixels and/or components from the one or more resultant images 290. After the one or more input overhead images have been segmented as discussed above to generate one or more image layers (e.g., L-S-D; A-S-D, etc.), the non-target mask 272 may be applied over the layer(s) to automatically remove portions that are highly likely to be non-target portions (e.g., portions that are not structures of interest). For instance, FIG. 12 presents such a mask over the same portion of Seattle, Wash. as in FIG. 11, where black regions correspond to the non-target candidates 268 and where white regions correspond to regions that are more likely than not to be target regions/candidates. FIG. 13 illustrates a fusion of L and S layers over the portion of Seattle, Wash. of FIG. 11 using an HSV transform to obtain a color output, where the mask of FIG. 12 has been applied thereover to automatically remove non-target portions.

Another manner of further refining target regions/candidates in the resultant images 290 (e.g., by identifying and removing non-target pixels/components/etc.) may include the CCCP engine 240 clustering 324 the pixels of the one or input overhead images (e.g., either all of the pixels or just those of the target candidates after application of the non-target mask 272) based on one or more of the critical parameters (e.g., one of the L, S or D parameters 264) into a number of new or second components 276 and then performing geometric attribute filtering 328 on the second components (by way of filtering 332 out non-target second components based on at least one geometric attribute). Stated differently, the clustering step 324 may include re-clustering the pixels of the one or more input overhead images into components in a manner different than that performed by the construction engine 228 to generate the hierarchical data structure 228 (e.g., the alpha partition pyramid 500 of FIG. 5).

Figure 7:
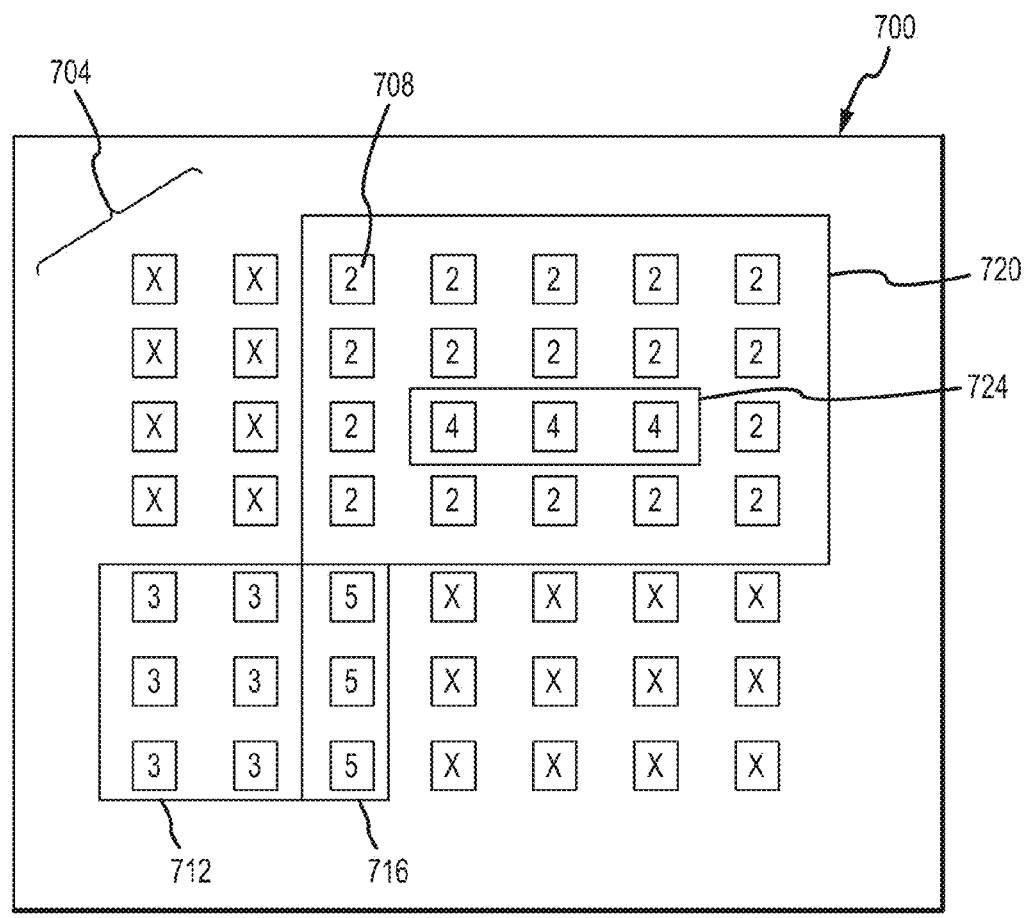
FIG. 7 is portion of a lifetime parameter image layer that illustrates clustering of pixels into second components based on common lifetime parameter values.

For instance, FIG. 7 is a simplified schematic view of a portion of an L-band image layer 700 that includes a plurality of rows and columns of pixels 704 of one or more input overhead images (only 49 shown in FIG. 7 in the interest of clarity) and arranged in a native format (e.g., in the same manner as the corresponding photosites of the image sensor (s)). Each pixel 704 having an "x" thereon may represent a non-target pixel that was removed from the analysis via the NTC engine 232 or the like. The remaining pixels 704 include values 708 that correspond to, for instance, their respective L parameter (although other of the critical parameters may be used for clustering as well). As such, a number of second components 276 (labeled in FIG. 2) each including pixels 704 having common (or substantially common) L parameters may be identified in the layer 700 such as second components 712, 716, 720 and 724.

One or more geometric or structural attributes 278 (e.g., contour-smoothness, linearity, entropy, moment invariants, etc.) of each of the second components 276 may be obtained in any appropriate manner and analyzed (e.g., via attribute filtering 280 as discussed herein) to identify non-target candidates 284 from the second components 276 (shown in FIG. 2). A mask 288 corresponding to the particular geographic area of the one or more input overhead images may be constructed with the non-target candidates 284 and used (e.g., by the mapping engine 248) to remove non-target structures (e.g., trees, other odd-shaped structures, etc.) that were not removed by application of the non-target mask 272. For instance, a second component 276 with a low contour-smoothness measure (e.g., indicating a severely distorted contour) is highly unlikely to be a building and may be correspondingly removed from the one or more image layers (e.g., an L-S-D layer fusion; an A-S-D layer fusion, etc.).

Another manner of further refining target regions/candidates in the resultant images 290 may include obtaining radiometric attributes 269 of any non-target candidates 268 (e.g., first components 252) identified by the NTC engine 232 and/or radiometric attributes 285 of any non-target candidates 284 (e.g., second components 276) identified by the CCCP engine and using the radiometric attributes to essentially create a spectral signature that may be used to eliminate or remove additional second components 278 (e.g., their pixels) from any resultant images 290. For instance, such a spectral signature may be useful to remove a tree (e.g., not a structure of interest) from the resultant image 290 that was not removed by the non-target mask 288 of the CCCP engine 240 due to its having a similar size and shape as a building (e.g., a structure of interest). As shown in FIG. 3, the method 300 may include performing radiometric filtering 332 of the second components 278, such as via the radiominer engine 244 executing a rule generator 291 to generate rules 292 and then application of generated rules 292 to target candidates (e.g., to retained second components 278). While generation of rules 292 based on radiometric attributes of both non-target candidates 268 of the first components 252 and non-target candidates 284 of the second components 276 is discussed, other arrangements envision that such radiometric attribute filtering may be based on only one of the radiometric attributes of the non-target candidates 268 of the first components 252 or those of the non-target candidates 284 of the second components 276.

Figure 10:
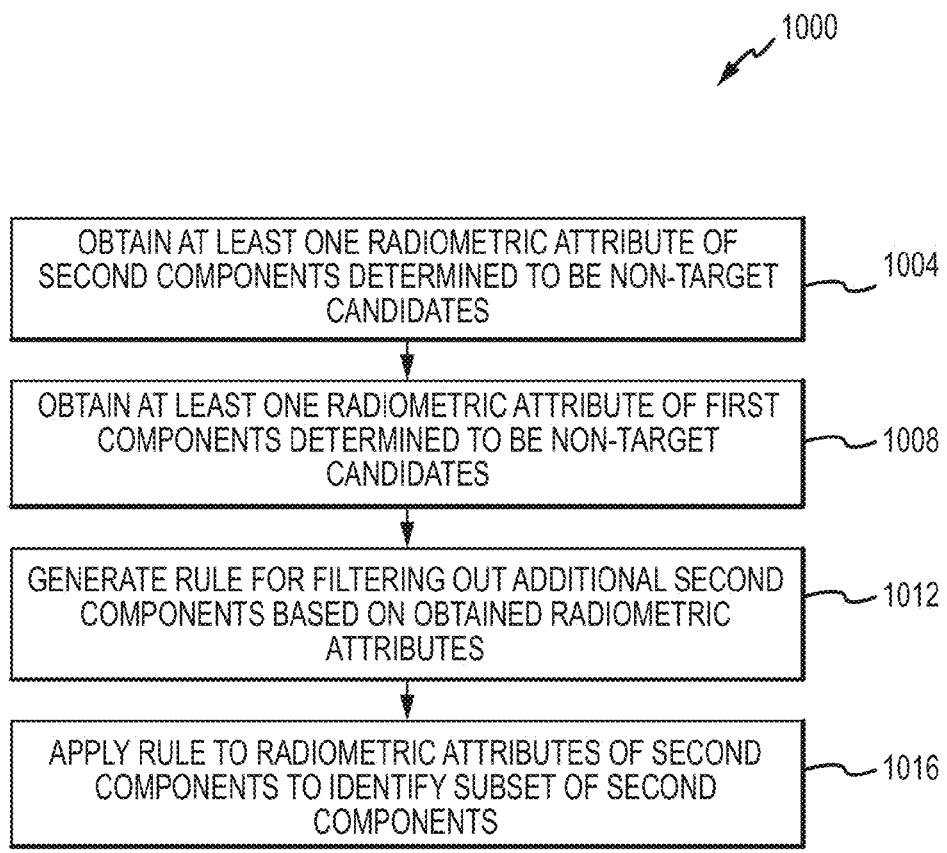
FIG. 10 is a flow diagram of a method for performing radiometric attribute filtering to further refine the target candidates in the at least one input overhead image.

Turning to FIG. 10, a method 1000 of performing radiometric attribute filtering is presented. At 1004, the method 1000 may include obtaining at least one radiometric attribute 285 (e.g., radiance, radiant flux, intensity, and/or the like) of any second components 278 determined to be non-target candidates 284 (e.g., during the geometric attribute filtering 280 and/or via application of a non-target mask 288). The method 1000 may also include obtaining 1008 at least one radiometric attribute 269 (e.g., radiance, radiant flux, intensity, and/or the like) of any first components 252 determined to be non-target candidates 268 (e.g., via application of a non-target mask 272). The method 1000 may then derive or generate 1012 one or more rules 292 for filtering out additional second components 278 (e.g., second components not via application of non-target masks 288) based on the radiometric attributes 287 obtained at 1004 and 1008.

As an example, the radiominer engine 244 may compute the Normalized Differential Vegetation Index (NDVI) and the Normalized Differential Water Index (NDWI) from the at least one input overhead image and maps the extent of each connected component under examination to the respective index images. In each index image, the mean spectral response of each connected component may be computed along with its proximity to the maximal index value. Based on empirical safe-estimate thresholds, components with close proximity to the index maximal value may be removed with high certainty of corresponding to vegetated regions on the ground or regions within water bodies. The radiominer engine 244 may be utilized if the non-target masks provided at the system input are not computed based on radiometric information but are instead semantics derived from geometrical, statistical or other image properties.

In one arrangement, the mapping engine 248 may apply one or more NT masks 294 (e.g., NT masks 272 and/or 288) to one or more image layers 293 (e.g., L-S-D; A-S-D, etc.) to obtain a set of target candidates 295 (e.g., pixels, components, second components) to which the rules 292 may be applied 1016 by a rule application module 296 (e.g. where any appropriate radiometric attributes of the target candidates 295 are obtained to which the rules 292 may be applied). The resulting candidates may be passed to one or more visualization tools 297 (e.g., HSV2RGB transform 298, labeling module 299, other color conversion tools, etc.) for generation of one or more resultant images 290 of structures of interest in any appropriate manner. In another arrangement, the rules 292 may be initially applied to any retained components in the NT masks 294 to further refine the NT masks 294 (e.g., by converting white, target portions to black, non-target portions). The refined NT masks 294 may then be applied to the image layers 293 and the resulting portions may be passed to one or more of the visualization tools 297 for generation of resultant images 290.

As an example, FIG. 11 presents one or more original 8-band WorldView 2 images over a portion of Seattle, Wash. FIG. 12 presents a fusion mask that, for instance, incorporates non-target masks 272 and 288 as well as any rules 292 generated by the radiominer engine 244 (e.g., where white portions correspond to target candidates that are to be retained and black portions correspond to non-target candidates that are to be removed). FIG. 13 presents a fusion of L-S-D layers over the portion of Seattle, Wash. of FIG. 11 using an HSV transform to obtain a color output, where the mask of FIG. 12 has been applied thereover to automatically remove non-target portions so that target portions (e.g., built-up) is displayed. For instance, a number of different structures 1104, 1108, 1112, 1116 and 1120 identified in FIG. 11 are differently colored in FIG. 13 (e.g., green, blue, pink, purple and red as indicated by the appropriate hash marks in the FIG. 13) to indicate that the structures are respectively associated with at least partially different L, S and/or D parameters.

Figure 14:
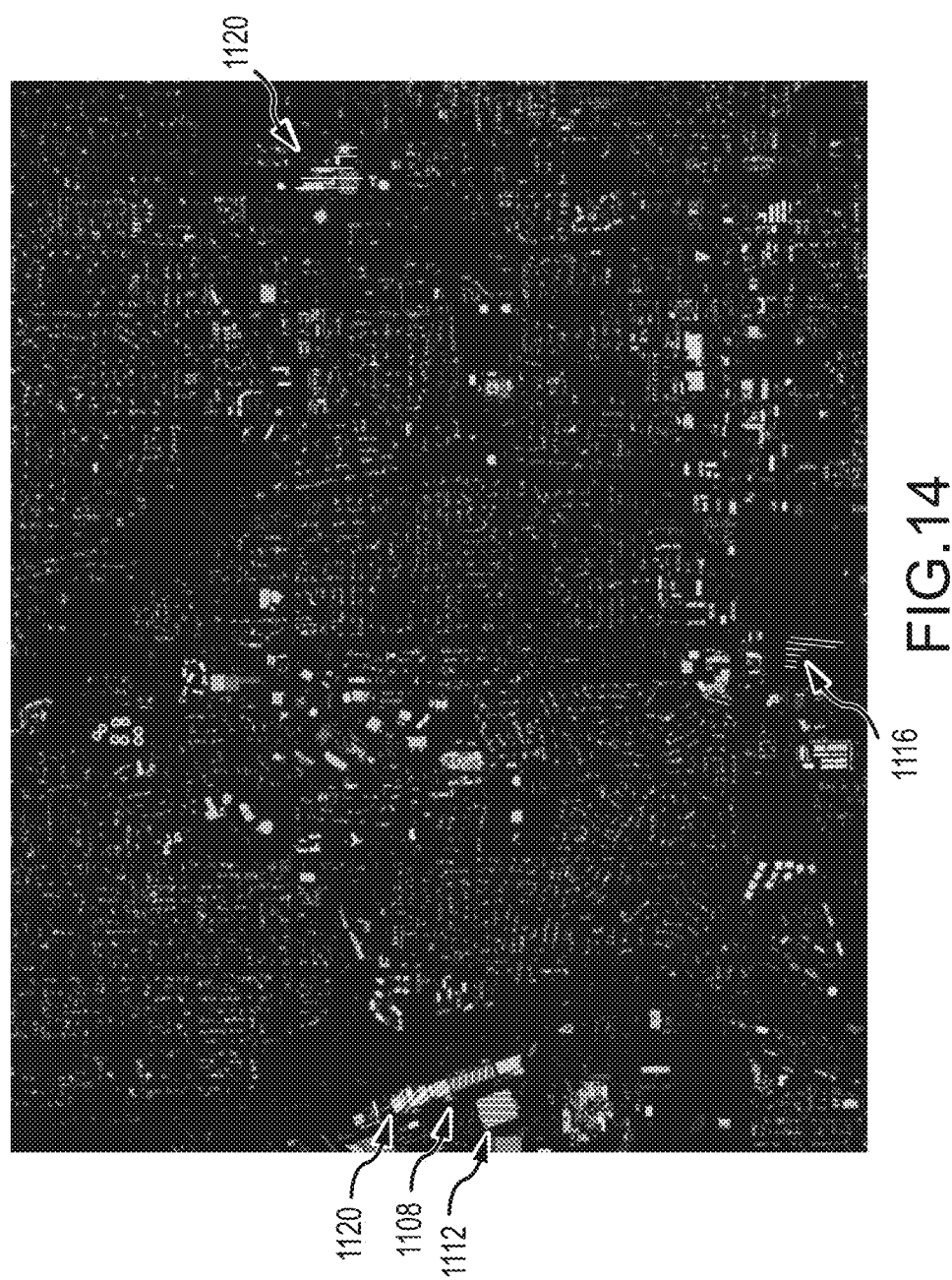
FIG. 14 is similar to FIG. 13 but with one of the critical parameters layers being replaced with a compactness layer.

As discussed previously, another fusion model is the A-S-D fusion whereby the L layer is substituted with one or more geometric descriptors of connected components shaped within the L layer and consisting of iso-intensity pixels to reduce the occurrence of cross-image instabilities. FIG. 14 presents such a model whereby the structures 1104, 1108, 1112, 1116 and 1120 are again identified. While it may appear that the colors/shades/tones of the structures 1104, 1108, 1112, 1116 and 1120 remain the same between FIGS. 13-14, at least one or more colors/shades/tones of the structures 1104, 1108, 1112, 1116 and 1120 and/or other unlabeled structures in FIG. 14 may change from those depicted in FIG. 13 to appropriately convey any appropriate geometric descriptor of connected components in place of conveying L parameter values.

Figure 15:
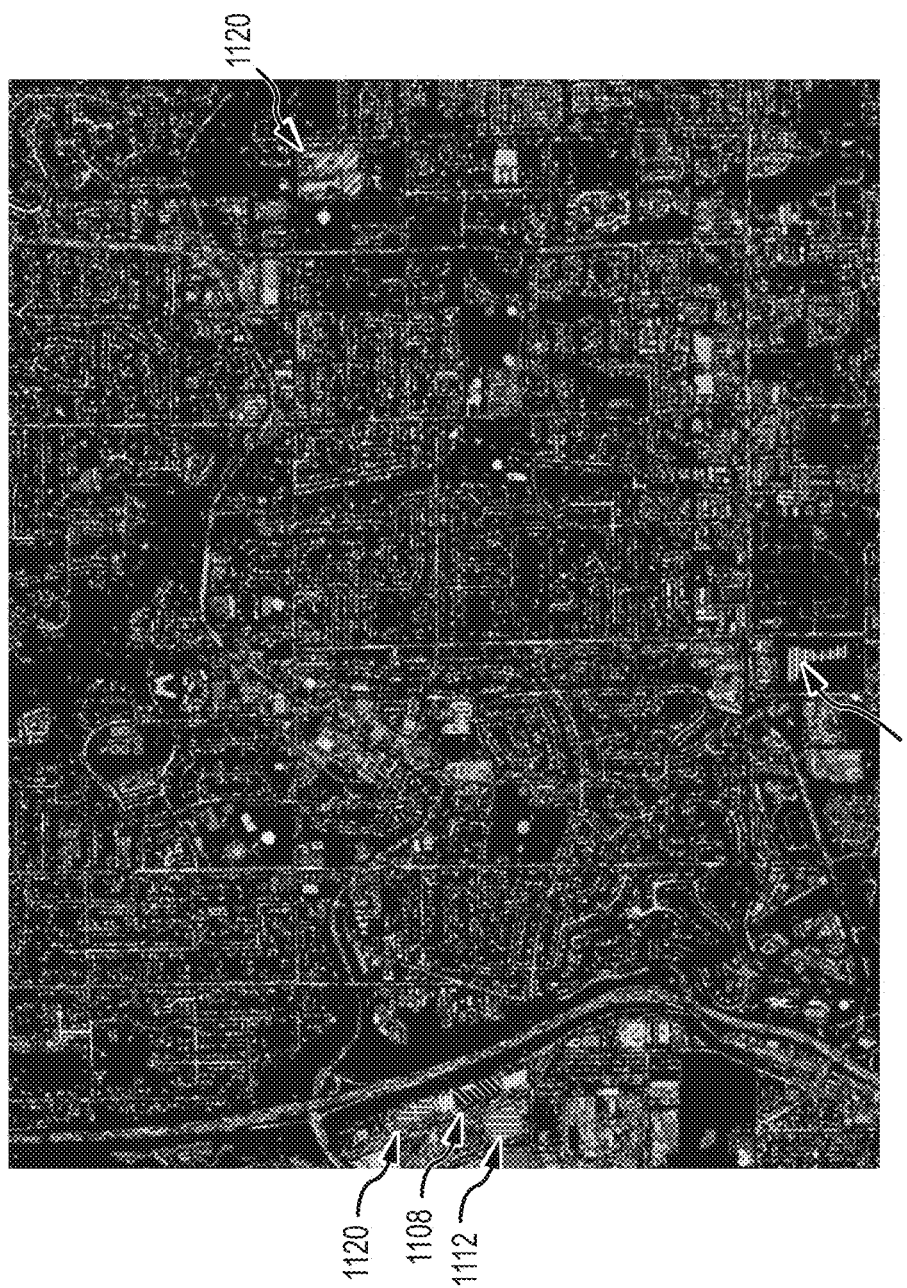
FIG. 15 is similar to FIG. 13 but where components are color coded based on unique identifiers of the components.

FIG. 15 presents an image similar to FIGS. 13-14 but where the unique identifier (e.g., label) of each of the target candidates 295 (e.g., the retained second components 278) are color coded. Specifically, a label of each component may be an integer number from the index set of all connected components assigned explicitly to a single component in order to address it and/or differentiate it from others. The label can be assigned any randomly generated color to allow for visualization of the same. As shown, the structures 1104, 1108, 1112, 1116 and 1120 may be differently colored (e.g., pink, brown, pink, grey, and green as indicated by the appropriate hash marks in the FIG. 15). It is noted that the various unlabeled structures have not been hashed to indicated appropriate color coding in FIGS. 13-15 in the interest of clarity.

The utilities disclosed herein may be used to generate a globally-consistent HR/VHR overhead image layer that includes structures of interest (e.g., built-up) and that is devoid of non-structures of interest. The globally-consistent layer can be used in numerous contexts such as in assessing population densities, qualities of life, vulnerability factors, disaster risks, sufficiency of civil infrastructures, economic growth, poverty levels, event monitoring and evolution, and the like.

It will be readily appreciated that many deviations and/or additions may be made from or to the specific embodiments disclosed in the specification without departing from the spirit and scope of the invention. In one arrangement, it is envisioned that different structures of interest (e.g., different types of built-up) may be differently shaded, colored, and/or the like in the resulting image to allow analysts to be able to quickly analyze the resulting image. As an example, the mapping engine 248 may analyze any appropriate feature elements (e.g., structural, geometric and/or radiometric attributes) of the target candidates 295 (e.g., second components 276 that identify structures of interest) to determine a type of built-up structure represented by the particular target candidate(s). For instance, buildings may exhibit one general type of feature element "signature" while tents may exhibit another type of feature element signature. The mapping engine 248 may have access to a database that correlates feature element signatures with respective colors, shades, and/or the like. During the mapping of the extracted target candidates into the resulting image, the mapping engine 295 may access the database and implement the colors, shades, etc. as appropriate.

In another arrangement, at least some attribute filtering may be performed on the one or more input overhead images before generation of DAP vectors 260 and LSD parameters 264 such that the DAP vectors 260 and LSD parameters 264 are only computed for pixels that are more likely than not to be structures of interest. In a further arrangement, the DAP engine 260 may tag the first components 252 of the hierarchical data structure 256 based on other types of geometric zones other than area zones (e.g., non-compactness zones and/or the like). Furthermore, it is not necessary that all of the various filtering steps disclosed herein are necessarily performed before presentation of the resultant images 290 for analysis by users. For instance, it may be advantageous in some contexts to observe one or more image layers (e.g., L-S-D fusion, etc.) that includes both structures of interest (e.g., built-up) and non-structures of interest (e.g., non-built-up).

Furthermore, it will be appreciated that a number of other 226 types of data or information (other than input overhead image data 224 and resultant images 290) may be stored in storage 212 as appropriate such as hierarchical data structures 256 and their first components 252, DAP vectors 260, LSD parameters 264, and the like. Still further, and as discussed herein, it is not necessary, unless otherwise specified, that the various functionalities disclosed herein are performed in the exact order and/or by the exact engine/module as illustrated and described herein.

Embodiments disclosed herein can be implemented as one or more computer program products, i.e., one or more modules of computer program instructions encoded on a computer-readable medium for execution by, or to control the operation of, data processing apparatus. For example, the logic or software of the construction engine 228, NTC engine 232, DAP engine 236, CCCP engine 240, radiominer engine 244 and mapping engine 248 responsible for the various functionalities disclosed herein may be provided in such computer-readable medium of the automated extraction system 200 and executed by the processor 208 as appropriate. The computer-readable medium can be a machine-readable storage device, a machine-readable storage substrate, a non-volatile memory device, a composition of matter affecting a machine-readable propagated signal, or a combination of one or more of them. In this regard, the system 200 may encompass one or more apparatuses, devices, and machines for processing data, including by way of example a programmable processor, a computer, or multiple processors or computers. In addition to hardware, the system 200 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., construction of the first and second hierarchical data structures and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A method for use in extracting structures of interest from overhead imagery data, comprising:
    identifying, using a processor, a plurality of groups of pixels in at least one input overhead image of a geographical region, wherein each pixel in each group is adjacent to at least one other pixel in the group, wherein adjacent pixels in each group do not differ by more than a predetermined level of a dissimilarity measure between the adjacent pixels, wherein a plurality of such groups of pixels at each of a plurality of successive predetermined levels of the dissimilarity measure are identified, wherein the groups at one of the predetermined levels are hierarchically related to the groups at an adjacent one of the predetermined levels in a hierarchical data structure, and wherein each group is a first component; and
    detecting first components in the hierarchical data structure that each include pixels collectively comprising a geometric attribute level greater than a threshold geometric attribute level.

2. The method of claim 1, wherein the detected first components comprise lower predetermined levels of the dissimilarity measure than other of the predetermined levels of the dissimilarity measure.

3. The method of claim 1, wherein the geometric attribute comprises geographical area.

4. The method of claim 1, wherein the geometric attribute comprises non-compactness.

5. The method of claim 1, further comprising:
    obtaining at least one attribute of each of the detected first components;

ascertaining whether the at least one attribute of each of the detected first components is associated with a structure of interest in the at least one input overhead image;

generating a first mask corresponding to the at least one input overhead image based on the detected first component ascertaining step that includes first regions that are ascertained to be associated with structures of interest and second regions that are ascertained to not be associated with structures of interest; and using the first mask to remove portions that are not associated with structures of interest from a resultant image of the geographical region.

6. The method of claim 5, further comprising:

tagging, using the processor, each of the first components based on a number of pixels present in the first component to identify one of a plurality of area zones within which the first component resides, wherein each successive area zone includes first components having a greater number of pixels that do the first components of a previous area zone;

generating for each pixel of the input overhead image, using the processor, a vector including a number of entries corresponding to each of the area zones from the tagging step, wherein each entry comprises a difference between a lowest dissimilarity measure level of a first component within which the pixel is disposed in the corresponding area zone and a lowest dissimilarity measure level of a first component within which the pixel is disposed in a subsequent area zone;

determining for each pixel of the input overhead image, using the processor, a largest entry in the vector corresponding to the pixel, wherein the largest entry is a lifetime parameter value;

clustering pixels in the image layer having common respective lifetime parameters into a plurality of corresponding second components;

obtaining at least one feature element of each of the second components; and ascertaining whether each of the second components is associated with a structure of interest in the at least one input overhead image based on the at least one feature element.

7. The method of claim 6, wherein the at least one feature element comprises at least one geometric attribute.

8. The method of claim 6, wherein the at least one feature elements comprise contour smoothness, linearity, entropy, moment invariants, area, or compactness.

9. The method of claim 6, further comprising:

generating a second mask corresponding to the at least one input overhead image based on the second component ascertaining step that includes first regions that are ascertained to be associated with structures of interest and second regions that are ascertained to not be associated with structures of interest; and using the second mask to remove portions that are not associated with structures of interest from the resultant image of the geographical region.

10. The method of 6, further comprising:

obtaining at least one additional feature element of each of the second components ascertained to not be structures of interest;

obtaining at least one additional feature element of each of the second components ascertained to be structures of interest;

analyzing the at least one additional feature elements of the second components ascertained to be structures of interest in view of the at least one additional feature elements of the second components ascertained to not be structures of interest; and removing second components ascertained to not be of interest from the resultant image of the geographical region based on the analyzing.

11. The method of claim 10, wherein the at least one additional feature elements are radiometric attributes.

12. The method of claim 10, further comprising:

color coding each of the mapped pixels in the resultant image based on the lifetime parameter value of the corresponding second component of the mapped pixel.

13. The method of claim 10, further comprising:

generating, with the processor, a rule for removing second components that are not associated with structures of interest in the at least one input overhead image using at least one additional feature element of the detected first components and the at least one additional feature element of the second components ascertained to not be of interest.

14. The method of claim 13, wherein each of the at least one additional feature elements are radiometric attributes.

15. The method of claim 13, further comprising:

obtaining at least one additional attribute of each of the second components ascertained to be associated with structures of interest in the at least one input overhead image;

applying, using the processor, the rule against the at least one additional attribute of each of the second components ascertained to be associated with structures of interest in the at least one input overhead image to remove second components that are not associated with structures of interest in the at least one input overhead image.

16. The method of claim 1, wherein the dissimilarity measure is a maximum intensity difference.

17. The method of claim 16, wherein the at least one input overhead image comprises a multispectral image including a plurality of spectral bands, and wherein the dissimilarity measure is a maximum intensity difference among all of the plurality of spectral bands.

18. The method of claim 1, further comprising:

tagging, using the processor, each of the first components based on a number of pixels present in the first component to identify one of a plurality of area zones within which the first component resides, wherein each successive area zone includes first components having a greater number of pixels than do the first components of a previous area zone; and generating for each pixel of the input overhead image, using the processor, a vector including a number of entries corresponding to each of the area zones from the tagging step, wherein each entry comprises a difference between a lowest dissimilarity measure level of a first component within which the pixel is disposed in the corresponding area zone and a lowest dissimilarity measure level of a first component within which the pixel is disposed in a subsequent area zone.

19. The method of claim 18, further comprising:

determining for each pixel of the input overhead image, using the processor, a largest entry in the vector corresponding to the pixel, wherein the largest entry is a lifetime parameter value.

20. The method of claim 19, further comprising:

generating an image layer that includes the lifetime parameter values of the pixels of the input overhead image.

21. The method of claim 20, further comprising:
mapping the lifetime parameter layer into a resultant image that is associated with the geographical region.

22. The method of claim 21, further comprising:
determining for each pixel of the input overhead image, using the processor, the area zone of the largest entry in the vector corresponding to the pixel, wherein the area zone of the largest entry is a scale parameter value;
generating an image layer that includes the scale parameter values of the pixels of the input overhead image; and
mapping the scale parameter layer into the resultant image that is associated with the geographical region.

23. The method of claim 22, further comprising:
determining for each pixel of the input overhead image, using the processor, the lowest predetermined level of the dissimilarity measure in the area zone of the largest entry in the vector corresponding to the pixel, wherein the lowest predetermined level of the dissimilarity measure in the area zone of the largest entry in the vector corresponding to the pixel is a dissimilarity parameter value;
generating an image layer that includes the dissimilarity parameter values of the pixels of the input overhead image; and
mapping the dissimilarity parameter layer into the resultant image that is associated with the geographical region.

24. The method of claim 23, further comprising:
utilizing a color conversion tool to map the lifetime, scale and dissimilarity parameter layers into the resultant image.

25. A system for extracting structures of interest from overhead imagery, comprising:
a construction engine, executable by a processor, that organizes a plurality of pixels of an input overhead image associated with a geographic area into a plurality of components of a hierarchical data structure, wherein each pixel in each group is adjacent to at least one other pixel in the group, wherein adjacent pixels in each group do not differ by more than a predetermined level of a dissimilarity measure between the adjacent pixels, wherein a plurality of such groups of pixels at each of a plurality of successive predetermined levels of the dissimilarity measure are identified, and wherein each group is a first component; and
a non-target clustering engine, executable by the processor, that:
detects first components in the hierarchical data structure that each include pixels collectively comprising a geometric attribute level greater than a threshold geometric attribute level;
obtains at least one attribute of each of the detected first components;
ascertains whether the at least one attribute of each of the detected first components is associated with a structure of interest in the at least one input overhead image; and
generates a mask corresponding to the geographic area based on the detected first component ascertaining step that includes first regions that are ascertained to be associated with structures of interest and second regions that are ascertained to not be associated with structures of interest.

26. The system of claim 25, further including:
a differential area profile (DAP) engine, executable by the processor, that:
tags each of the first components to identify one of a plurality of area zones within which the first component resides based on a number of pixels present in the first component, wherein each successive area zone includes first components having a greater number of pixels than do the first components of a previous area zone;
generates, for each pixel of the input overhead image, a vector including a number of entries corresponding to each of the area zones, wherein each entry comprises a difference between a lowest dissimilarity measure level of a first component within which the pixel is disposed in the corresponding area zone and a lowest dissimilarity measure level of a first component within which the pixel is disposed in a subsequent area zone; and
derives, for each pixel of the input overhead image, at least one attribute of the pixel based on the vector of the pixel.

27. The system of claim 26, wherein the DAP engine derives at least one attribute of each pixel by determining a largest entry in the vector corresponding to the pixel, wherein the largest entry is a lifetime attribute.

28. The system of claim 27, wherein the DAP engine derives at least one attribute of each pixel by determining the area zone of the largest entry in the vector corresponding to the pixel, wherein the area zone of the largest entry is a scale attribute.

29. The system of claim 28, wherein the DAP engine derives at least one attribute of each pixel by determining the lowest predetermined level of the dissimilarity measure in the area zone of the largest entry in the vector corresponding to the pixel, wherein the lowest predetermined level of the dissimilarity measure in the area zone of the largest entry in the vector corresponding to the pixel is a dissimilarity attribute.

30. The system of claim 25, wherein the detected first components comprise lower predetermined levels of the dissimilarity measure than other of the predetermined levels of the dissimilarity measure.

31. The system of claim 30, wherein the geometric attribute comprises geographical area.

32. The system of claim 30, wherein the geometric attribute comprises non-compactness.

33. The system of claim 30, further comprising a mapping engine that:
generates an image layer based on the at least one attributes of the pixels;
applies the mask over the image layer to remove regions of the image layer that are not associated with structures of interest; and
maps resulting portions of the image layer into a resultant image that is associated with the geographical region.

* * * * *